(12) United States Patent
Yasuda

(10) Patent No.: US 8,013,892 B2
(45) Date of Patent: Sep. 6, 2011

(54) PHOTOGRAPHING APPARATUS, CONTROL METHOD FOR LENS BARREL OF PHOTOGRAPHING APPARTUS, PRINTER, CONTROL METHOD FOR PRINTER, AND PRINTING SYSTEM

(75) Inventor: Tomonaga Yasuda, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/830,985

(22) Filed: Jul. 6, 2010

(65) Prior Publication Data

US 2010/0271491 A1 Oct. 28, 2010

Related U.S. Application Data

(63) Continuation of application No. 10/936,038, filed on Sep. 8, 2004, now Pat. No. 7,777,779.

(30) Foreign Application Priority Data

| Sep. 10, 2003 | (JP) | P 2003-318173 |
| Sep. 10, 2003 | (JP) | P 2003-318174 |
| Sep. 10, 2003 | (JP) | P 2003-318175 |
| Sep. 10, 2003 | (JP) | P 2003-318176 |

(51) Int. Cl.
*H04N 5/225* (2006.01)
(52) U.S. Cl. .................. 348/207.1; 348/207.2
(58) Field of Classification Search ............... 348/207.1, 348/207.2
See application file for complete search history.

(56) References Cited

U.S. PATENT DOCUMENTS

| 6,618,553 | B1 | 9/2003 | Shiohara |
| 6,753,921 | B1 | 6/2004 | Shimizu |
| 6,850,271 | B1 | 2/2005 | Ichikawa |
| 6,856,345 | B1 * | 2/2005 | Yamamoto et al. ........ 348/207.2 |
| 6,950,125 | B1 | 9/2005 | Sato |
| 6,950,126 | B1 | 9/2005 | Homma et al. |
| 6,952,222 | B2 | 10/2005 | Sekine |
| 6,957,040 | B1 | 10/2005 | Tanaka |
| 7,046,276 | B2 | 5/2006 | Hashimoto et al. |
| 7,236,186 | B2 | 6/2007 | Ito et al. |
| 7,265,779 | B2 | 9/2007 | Sato et al. |

(Continued)

FOREIGN PATENT DOCUMENTS

JP  11-046331  2/1999

(Continued)

OTHER PUBLICATIONS

Notice of Reasons for Rejection for Japanese Patent Application No. 2003-318174, drafted Aug. 21, 2008 (3 pgs.) with translation (4 pgs.).

(Continued)

*Primary Examiner* — Tuan Ho
*Assistant Examiner* — Kent Wang
(74) *Attorney, Agent, or Firm* — John C. Pokotylo; Straub & Pokotylo

(57) ABSTRACT

In this photographing apparatus, when it is recognized that communication with an external device is possible, the operating mode is set to the communication mode, in which communication can be carried out with the external device. Once there is communication connection with the external device, signals to change the mode from the mode selecting device, which directs the operating mode of the photography apparatus, are ignored, and a shift from the communication mode to another mode is prohibited.

4 Claims, 22 Drawing Sheets

U.S. PATENT DOCUMENTS

| | | |
|---|---|---|
| 7,414,746 B2 | 8/2008 | Tanaka et al. |
| 2001/0020980 A1 | 9/2001 | Misawa |
| 2002/0093583 A1 | 7/2002 | Ito |
| 2002/0149676 A1 | 10/2002 | Hatori |
| 2003/0016378 A1 | 1/2003 | Ozawa et al. |
| 2003/0025796 A1 | 2/2003 | Yamagishi |
| 2003/0122935 A1* | 7/2003 | Shiohara ............... 348/207.2 |
| 2003/0184650 A1* | 10/2003 | Brown et al. ........... 348/207.1 |
| 2004/0041911 A1 | 3/2004 | Odagiri et al. |
| 2004/0056956 A1 | 3/2004 | Gardiner et al. |
| 2004/0141083 A1* | 7/2004 | Takashima ............ 348/333.01 |
| 2004/0223060 A1* | 11/2004 | Yasuda ................. 348/207.1 |
| 2005/0001902 A1* | 1/2005 | Brogan et al. ......... 348/207.1 |

FOREIGN PATENT DOCUMENTS

| | | |
|---|---|---|
| JP | 2000-132434 | 5/2000 |
| JP | 2000-228742 | 5/2000 |
| JP | 2001-326839 | 11/2001 |
| JP | 2002-218300 | 8/2002 |
| JP | 2002-252798 * | 9/2002 |
| JP | 2002-262172 | 9/2002 |
| JP | 2002-342050 | 11/2002 |
| JP | 2003-101841 | 4/2003 |
| JP | 2003-125264 | 4/2003 |
| JP | 2003-140216 | 5/2003 |
| JP | 2004-096329 | 3/2004 |
| JP | 2004-173263 | 6/2004 |

OTHER PUBLICATIONS

Notice of Reasons for Rejection for Japanese Patent Application No. 2003-318176, mailed Nov. 4, 2008 (3 pgs.) with translation (4 pgs.).

Notice of Reasons for Rejection for Japanese Patent Application No. 2003-318175, mailed Jun. 23, 2009 (3 pgs.) with translation (3 pgs.).

Notice of Reasons for Rejection for Japanese Patent Application No. 2003-318175, mailed Mar. 2, 2010 (4 pgs.) with translation (4 pgs.).

Notice of Reasons for Rejection for Japanese Patent Application No. 2008-109780, mailed Jun. 7, 2011 (2 pgs.) with translation (2 pgs.).

* cited by examiner

FIG. 15

```
[HDR]
GEN REV=01.00                                          100B
GEN CRT="OLYMPUS X-1"
[JOB]
PRT PID=001
PRT TYP=STD                                  111B
110B  PRT QTY=001
IMG FMT=EXIF2 -J
<IMG SRC="../DCIM/168OLYMP/P1100001.JPG">
CFG DSC="03.01.10" -ATR DTM
[JOB]
PRT PID=002
PRT TYP=STD                                  121B
120B  PRT QTY=001
IMG FMT=EXIF2 -J
<IMG SRC="../DCIM/168OLYMP/P1100002.JPG">
CFG DSC="03.01.10" -ATR DTM
[JOB]
PRT PID=003
PRT TYP=STD                                  131B
130B  PRT QTY=001
IMG FMT=EXIF2 -T
<IMG SRC="../DCIM/168OLYMP/P1110003.TIF">
CFG DSC="03.01.11" -ATR DTM
[JOB]
PRT PID=004
PRT TYP=STD                                  141B
140B  PRT QTY=001
IMG FMT=EXIF2 -J
<IMG SRC="../DCIM/168OLYMP/P1110004.JPG">
CFG DSC="03.01.11" -ATR DTM
[JOB]
PRT PID=005
PRT TYP=STD                                  151B
150B  PRT QTY=001
IMG FMT=EXIF2 -T
<IMG SRC="../DCIM/168OLYMP/P1110005.TIF">
CFG DSC="03.01.11" -ATR DTM
```

FIG. 19

```
        [HDR]                                              200B
        GEN REV=01.00
        GEN CRT="OLYMPUS X-1"
       ┌[JOB]
       │ PRT PID=001
       │ PRT TYP=STD
 110B ─┤ PRT QTY=001
       │ IMG FMT=EXIF2 -J
       │ <IMG SRC="../DCIM/168OLYMP/P1100001.JPG">
       └ CFG DSC="03.01.10" -ATR DTM
       ┌[JOB]
       │ PRT PID=002
       │ PRT TYP=STD
 120B ─┤ PRT QTY=001
       │ IMG FMT=EXIF2 -J
       │ <IMG SRC="../DCIM/168OLYMP/P1100002.JPG">
       └ CFG DSC="03.01.10" -ATR DTM
       ┌[JOB]
       │ PRT PID=003
       │ PRT TYP=STD
 140B ─┤ PRT QTY=001
       │ IMG FMT=EXIF2 -J
       │ <IMG SRC="../DCIM/168OLYMP/P1110004.JPG">
       └ CFG DSC="03.01.11" -ATR DTM
```

FIG. 21

```
         [HDR]                                               300B
         GEN REV=01.00
         GEN CRT="OLYMPUS X-1"
       ⎧ [JOB]
       ⎪ PRT PID=001
       ⎪ PRT TYP=STD
 130B ⎨ PRT QTY=001
       ⎪ IMG FMT=EXIF2 -T
       ⎪ <IMG SRC="../DCIM/168OLYMP/P1110003.TIF">
       ⎩ CFG DSC="03.01.11" -ATR DTM
       ⎧ [JOB]
       ⎪ PRT PID=002
       ⎪ PRT TYP=STD
 150B ⎨ PRT QTY=001
       ⎪ IMG FMT=EXIF2 -T
       ⎪ <IMG SRC="../DCIM/168OLYMP/P1110005.TIF">
       ⎩ CFG DSC="03.01.11" -ATR DTM
```

PHOTOGRAPHING APPARATUS, CONTROL METHOD FOR LENS BARREL OF PHOTOGRAPHING APPARTUS, PRINTER, CONTROL METHOD FOR PRINTER, AND PRINTING SYSTEM

CROSS REFERENCES TO RELATED APPLICATIONS

This application is a continuation application of U.S. patent application Ser. No. 10/936,038 (referred to as "the '038 application" and incorporated herein by reference) filed on Sep. 8, 2004 now U.S. Pat. No. 7,777,779, titled "PHOTOGRAPHING APPARATUS, CONTROL METHOD FOR LENS BARREL OF PHOTOGRAPHING APPARATUS, PRINTER, CONTROL METHOD FOR PRINTER, AND PRINTING SYSTEM," listing Tomonaga YASUDA as the inventor, and claiming the benefit of Japanese Patent Application No. 2003-318173 filed on Sep. 10, 2003, Japanese Patent Application No. 2003-318174 filed on Sep. 10, 2003, Japanese Patent Application No. 2003-318175 filed on Sep. 10, 2003, and Japanese Patent Application No. 2003-318176 filed on Sep. 10, 2003. The entire contents of each of the four provisional applications are incorporated herein by their reference.

BACKGROUND OF THE INVENTION

1. Field of the Invention

The present invention relates to a photographing apparatus, such as a digital camera. The present invention relates to a photographing apparatus having a collapsible lens barrel, a printing system provided with this photographing apparatus and a printer, and a control method for the lens barrel of the photographing apparatus. The present invention relates to a printer, a control method therefore, and a printing system.

2. Description of Related Art

Digital cameras of improved portability are conventionally known in which the lens barrel moves from a collapsed position inside the camera body to a photograph ready position at which the lens projects out from the front face of the camera body when taking a picture, and collapses from the photograph ready position to the collapsed position inside the camera body when not taking a picture. Various types of digital cameras such as this are known, including a type in which the collapse of the lens barrel is controlled by the ON/OFF of the power supply switch, a type in which the collapse of the lens barrel is controlled by moving a barrier that is provided on the front face of the camera body from a closed position where it covers the lens to an open position where it exposes the lens, and a type in which the collapse of the lens barrel is controlled by the attachment to or release from the camera body of a power supply used for photographing. As an example of a type of digital camera in which the collapse of the lens barrel is controlled by attachment to or release from the camera body of a photography power supply, a digital camera is known in which the lens moves to the photograph ready position when the photography power supply is attached to a memory card with photographing functions that can be mounted to an external controller, and the lens collapses when the photography power supply is released (refer to Japanese Patent Unexamined Application, First Publication No. H08-125962, for example).

Further, a system (PictBridge system) has been realized in recent years for directly connecting a digital camera and a printer using a USB (Universal Serial Bus) cable, and directly sending the desired image data from the digital camera to the printer for printing. In this system, the user selects the images he wishes to print while viewing the digital camera's liquid crystal screen. The selected images are then provided from the digital camera to the printer via the USB cable, and printed.

When the user is printing the photographed images using the PictBridge system, this printing has conventionally been performed via the four sequences of: connecting the digital camera and the printer with the USB cable, turning ON the main power supply for the digital camera (with the digital camera automatically entering the photography mode as a result), switching the operating mode of the digital camera to playback mode, and carrying out a print output operation from the digital camera.

Further, a system (PictBridge system) has been realized in recent years for directly connecting a digital camera and a printer using a USB (Universal Serial Bus) cable, and directly sending the desired image data from the digital camera to the printer for printing. This system eliminates the need to take a memory card or other such recording media on which the photographed images are recorded to a lab service shop, and is therefore highly regarded. In addition, in the PictBridge system, it is also possible to perform printing using DPOF (Digital Print Order Format) information.

In DPOF, the source information for the image the user wishes to print (image file name), date/time, number of prints, print type (normal print or index print), character or title information, image rotation information, trimming information, etc. are specified as types of printing control information. In this DPOF, by recording the images photographed by the digital camera along with the necessary printing control information in a memory card or the like, and bringing this to a lab service shop, the desired image can be printed out easily.

Further, in the PictBridge system, first, the digital camera supplies the DPOF file in which the DPOF printing control information is stored to the printer. Next, the printer requests the image file designated to be printed in the DPOF file from the digital camera. The digital camera then supplies the requested image file to the printer. Next, the printer prints the supplied image file. Printing of the image file is thus controlled in this way, enabling printing of an image using DPOF in the PictBridge system.

As a result, by device of a single printing control arrangement (DPOF), printing of the photographed image is possible using either a lab service shop or a PictBridge system.

However, when DPOF is used with the PictBridge system, if the type of image file that has been designated for printing in the DPOF is not supported by the printer, then printing cannot be carried out normally. For this reason, conventionally, the digital camera converts the form of the image file to match the printer (refer to Japanese Unexamined Patent Application, First Publication No. H10-65867). In addition, cases have also been reported in which printing could not be executed when the form of the image file designated for printing in the DPOF is not supported by the printer (see Japanese Unexamined Patent Application, First Publication No. 2001-138611).

SUMMARY OF THE INVENTION

The present invention provides a photographing apparatus that supply an image file to an external device to which it is connected to enable communication therewith, the photographing apparatus including:

a signal receiving device for receiving a signal that is output from the external device;

a communication state recognizing device for recognizing whether or not communication with the external device is possible based on the signal received by the signal receiving device;

a mode setting device for shifting the operating mode of the photographing apparatus to the communication mode, in which communication with the external device is carried out, when the communication state recognizing device recognizes that communication with the external device is possible;

a mode selecting device which is manipulated by the user when the user selects the operating mode; and a shift prohibiting device for ignoring the directives of the mode selecting device and prohibiting shift from the communication mode to another mode when communication with the external device is possible.

The present invention provides a photographing apparatus including:

a lens barrel that is movable between a collapsed position in which the lens barrel is collapsed inside the body of the photographing apparatus and a projecting position in which the lens barrel projects out from the front face of the photographing apparatus;

a signal receiving device for receiving a signal that is output from an external device;

a communication state recognizing device for recognizing whether or not communication with the external device is possible based on the signal received by the signal receiving device;

a movement mechanism for moving the lens barrel between the collapsed position and the projecting position; and a barrel controlling device for driving the movement mechanism to move the lens barrel from the projecting position to the collapsed position, when the lens barrel has been in the projecting position, the communication state recognizing device recognizes that communication with the external device is possible.

The present invention provides a photographing apparatus including:

a lens barrel that is movable between a collapsed position in which the lens barrel is collapsed inside the body of the photographing apparatus, and a projecting position in which the lens barrel projects out from the front face of the body of the photographing apparatus; a signal receiving device for receiving a signal output from the external device via a communication cable that is connected to the external device;

a communication state recognizing device for recognizing whether or not communication with the external device is possible based on the signal received by the signal receiving device;

a movement mechanism for moving the lens barrel between the collapsed position and the projecting position;

an external device recognizing device for recognizing the type of external device once the communication state recognizing device recognizes that communication with the external device is possible; and a barrel controlling device for activating the movement mechanism to move the lens barrel from the projecting position to the collapsed position, when the lens barrel has been in the projecting position, the external device recognizing device recognizes the type of external device.

The present invention provides a printing system including:

a photographing apparatus includes a lens barrel that is movable between a collapsed position in which the lens barrel is collapsed inside the body of the photographing apparatus and a projecting position in which the lens barrel projects out from the front face of the body of the photographing apparatus; and a printer that is connected via a communication cable to the photographing apparatus and print an image file that is supplied from the photographing apparatus; wherein the printer includes, an outputting device for outputting a signal to the photographing apparatus via the communication cable, and a printing control device for printing the image file that is supplied from the photographing apparatus based on directives from the photographing apparatus, the photographing apparatus includes, a signal receiving device for receiving a signal output from the printer via the communication cable, a communication state recognizing device for recognizing whether or not communication with the printer is possible based on the signal received by the signal receiving device, a printer recognizing device for recognizing whether or not the partner connected via the communication cable is a printer, a movement mechanism for moving the lens barrel between the collapsed position and the projecting position, and a barrel controlling device for driving the movement mechanism to move the lens barrel from the projecting position to the collapsed position, when the lens barrel has been in the projecting position, and the communication state recognizing device recognizes that communication with the printer is possible or when the lens barrel has been in the projecting position, and the printer recognizing device recognizes that the partner connected via the communication cable is a printer.

The present invention provides a lens barrel controlling method for a photographing apparatus includes a lens barrel that is movable between a collapsed position in which the lens barrel is collapsed inside the body of the photographing apparatus and a projecting position in which the lens barrel projects out from the front face of the body of the photographing apparatus, including the steps of:

receiving a signal output from an external device;

recognizing whether or not communication with the external device is possible based on the received signal; and moving the lens barrel from the projecting position to the collapsed position when the lens barrel is in the projecting position, and it is recognized that communication with the external device is possible.

The present invention provides a lens barrel controlling method for a photographing apparatus includes a lens barrel that is movable between a collapsed position in which the lens barrel is collapsed inside the body of the photographing apparatus and a projecting position in which the lens barrel projects out from the front face of the body of the photographing apparatus, including the steps of:

receiving a signal output from an external device via a communication cable that is connected to the external device;

recognizing whether or not communication with the external device is possible based on the received signal;

recognizing the type of external device after recognizing that communication with the external device is possible; and moving the lens barrel from the projecting position to the collapsed position when the lens barrel is in the projecting position, and the type of external device is recognized.

The present invention provides a photographing apparatus that supply an image file to an external device to which it is connected to enable communication therewith, the photographing apparatus including:
- a signal receiving device for receiving a signal output from the external device;
- a communication state recognizing device for recognizing whether or not communication with the external device is possible based on the signal received by the signal receiving device;
- an operating mode confirming device for confirming the operating mode selected by the user when the communication state recognizing device recognizes that communication with the external device is not possible; and
- a mode setting device for shifting the operating mode of the photographing apparatus to the communication mode, in which communication with the external device is carried out, when the communication state recognizing device recognizes that communication with the external device is possible, and shifts the operating mode from the communication mode to the operating mode confirmed by the operating mode confirming device when the communication state recognizing device recognizes that communication with the external device is not possible.

The present invention provides a photographing apparatus that can supply an image file to an external device, including:
- a signal receiving device for receiving a signal output from the external device;
- a communication state recognizing device for recognizing whether or not communication with the external device is possible based on the signal received by the signal receiving device;
- a mode setting device for setting the operating mode of the photographing apparatus to the communication mode, in which communication with the external device is carried out, when the communication state recognizing device recognizes that communication with the external device is possible;
- a recording device for recording the operating mode that preceded setting to the communication mode; and
- a mode resetting device for resetting the operating mode from the communication mode to the operating mode recorded in the recording device when the communication state recognizing device recognizes that communication with the external device is not possible.

The present invention provides a printer that acquires and prints an image file from an image file supplying device to which it is connected to enable communication therewith, including:
- a printability judging device for, judging whether or not the form of the image file to be printed is a form that is capable of being printed, by referencing a printing control information storing file that stores the file name and form of the image file to be printed; and an image acquiring device for acquiring from the image file supplying device only those image files that are in a form capable of being printed from among the stored image files for which file name and form are stored in the printing control information storing file.

The present invention provides a printer control method for acquiring and printing an image file from an image file supplying device to which it is connected to enable communication therewith, the method including the steps of:
- judging whether or not the form of the image file to be printed is a form that is capable of being printed, by referencing a printing control information storing file that stores the file name and form of the image file to be printed; and
- acquiring from the image file supplying device only those image files that are in a form capable of being printed from among the stored image files for which file name and form are stored in the printing control information storing file.

The present invention provides a printing system including:
- a photographing apparatus; and
- a printer that is connected to enable communication with the photographing apparatus and that acquires and prints an image file from the photographing apparatus;
- wherein the photographing apparatus includes,
- a file supplying device that supplies to the printer a printing control information storing file in which the file name and form of the image file to be printed are stored, and
- an image supplying device that supplies an image file to the printer, the printer includes,
- a printability judging device for judging whether or not the form of the image file to be printed is a form that is capable of being printed, by referencing a printing control information storing file that is supplied from the photographing apparatus, and
- an image acquiring device for acquiring from the image file supplying device only those image files that are in a form capable of being printed from among the stored image files for which file name and form are stored in the printing control information storing file.

The present invention provides a printer for printing an image file supplied from an image file supplying device, including:
- a printable file recognizing device for recognizing as printable files those image files that are in a form that is printed, from among the image files whose file name and form are stored in a printing control information storing file that is acquired from the image file supplying device;
- a first list forming device for forming a list of printable files;
- a printable file requesting device for requesting from the image file supplying device the image files that are included in the list of printable files; and
- an image file receiving device for receiving the image file sent from the image file supplying device.

The present invention provides a control method for a printer that prints an image file supplied from an image file supplying device, including the steps of:
- recognizing as printable files those image files that are in a form that is printed, from among the image files whose file name and form are stored in a printing control information storing file that is acquired from the image file supplying device;
- forming a list on which only printable files are collected;
- requesting from the image file supplying device the image files that are included in the list of printable files; and
- receiving the image file sent from the image file supplying device.

BRIEF DESCRIPTION OF THE DRAWINGS

FIG. 15 is a view showing an example of a DPOF file according to a third embodiment of the present invention.

FIG. 19 is a view showing an example of a printing completed DPOF file.

FIG. 21 is a view showing an example of a printing incomplete DPOF file.

DETAILED DESCRIPTION OF THE INVENTION

A first preferred embodiment of the present invention will now be explained with reference to FIG. 1 through 12.

Figure 1:
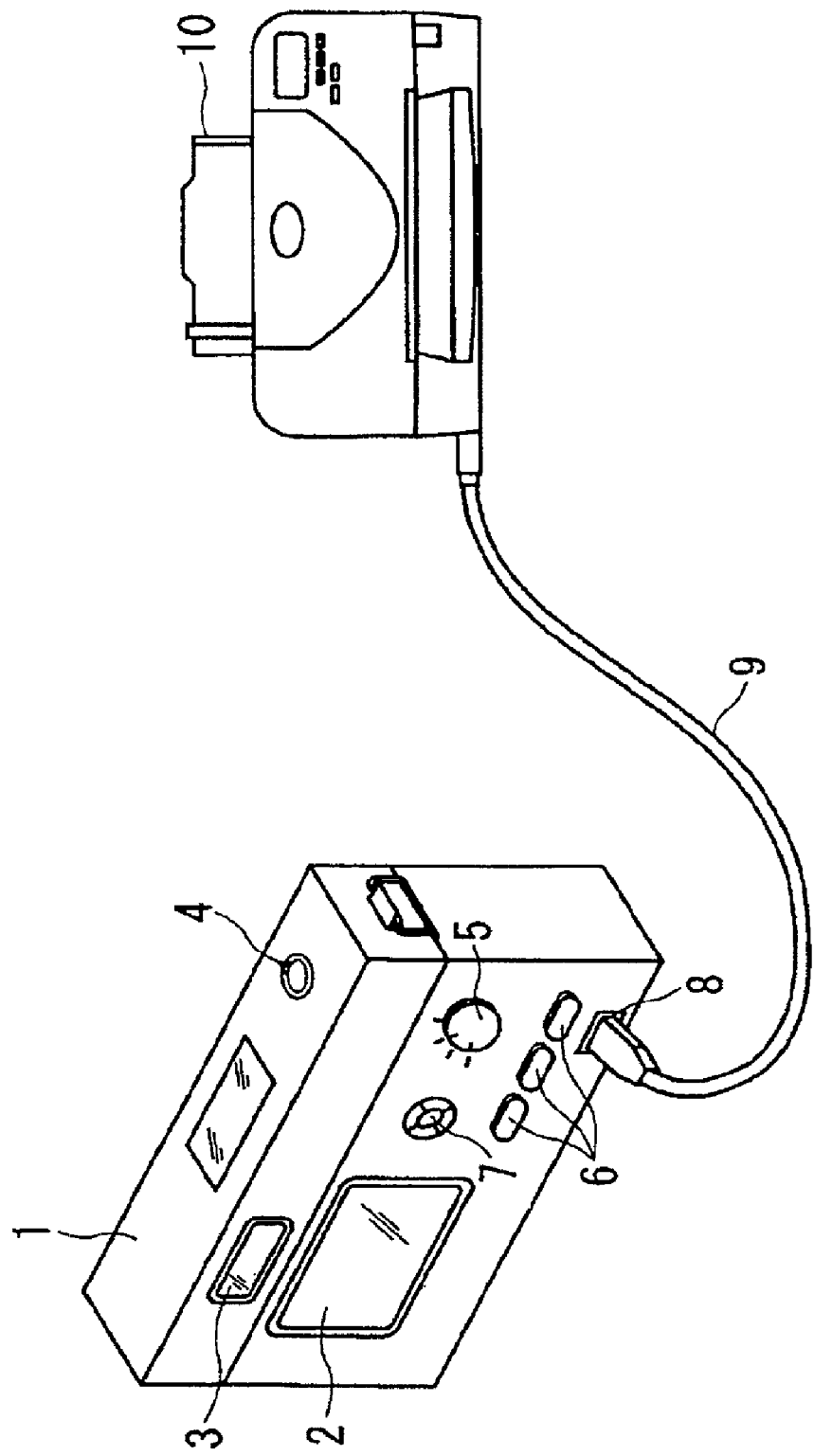
FIG. 1 is a exterior view showing the structure of a PictBridge system in which the digital camera (digital camera 1) according to a first embodiment of the present invention is employed.

FIG. 1 is a exterior view showing the structure of a direct print system in which a printer and a digital camera, which is the photographing apparatus, are directly connected via a USB cable (this system hereinafter referred to by its common name, "PictBridge system"). The PictBridge system shown in FIG. 1 includes a digital camera 1 and a printer 10, which is connected to digital camera 1 via a USB cable 9. Digital camera 1 and printer 10 can mutually send and receive data via the USB connection.

As shown in FIG. 1, a release switch button 4 or the like is disposed to the top surface of the camera body of digital camera 1. A view finder window 3, a LCD display 2, a dial switch 5 which serves as a power supply switch and mode selecting switch, a cross-key switch which serves as the cursor operating switch for LCD display 2, menu selecting switches 6, and a USB connector 8, etc. are disposed on the rear surface of the camera body. One end of USB cable 9 is connected to USB connector 8 as shown in the figure.

In addition to the above, a photography lens, a finder window, a strobe window and the like, which are not shown in the figure, are disposed to the front face of the camera body. A card connector which stores a memory card, which is the recording media for the photographed image data, and a battery housing chamber, which houses the battery, are not shown in the figure but are disposed to the side or bottom surfaces of the camera body.

Figure 2:
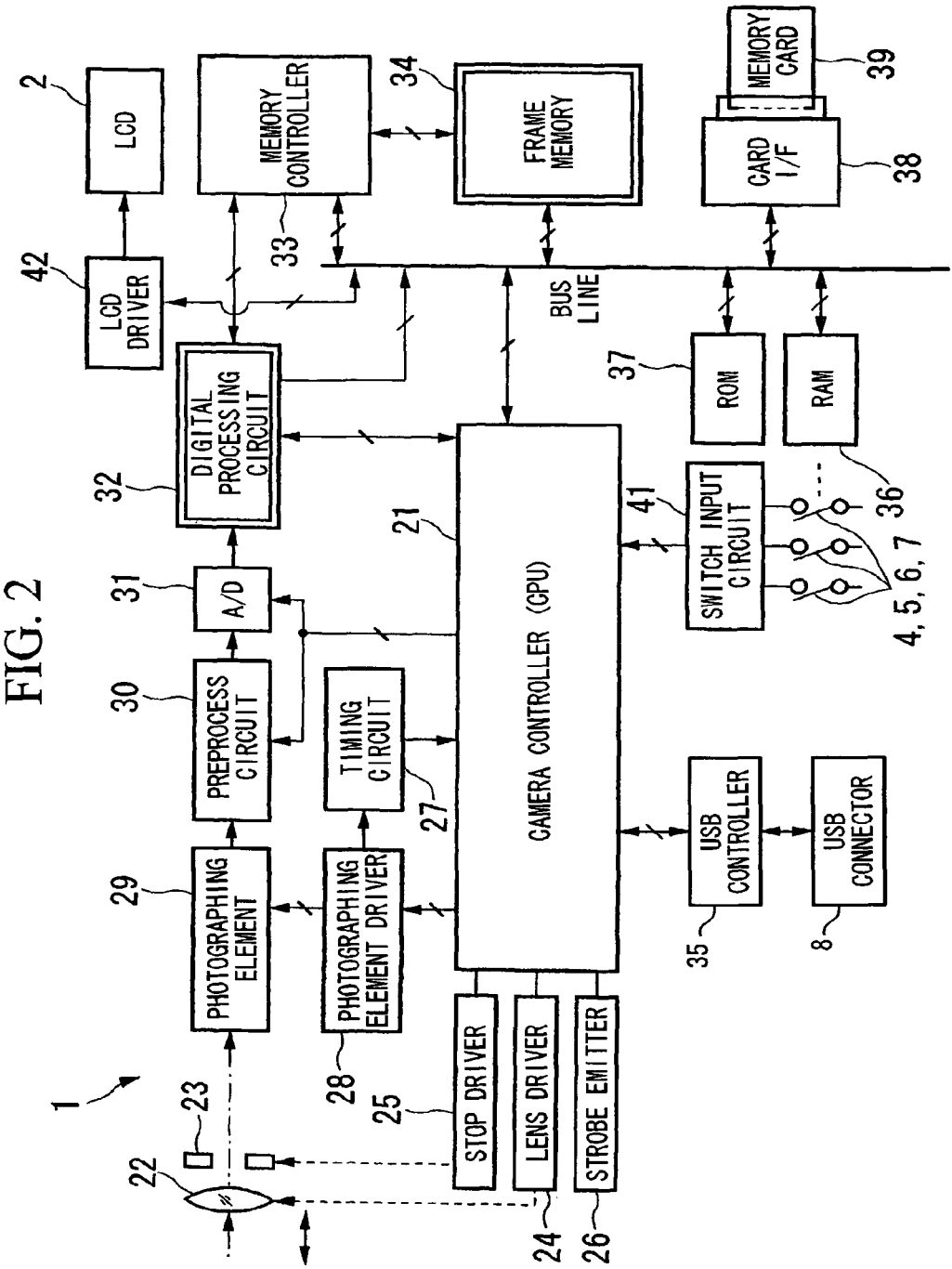
FIG. 2 is a block diagram showing the detailed structure of digital camera 1.

Next, the structure of digital camera 1 will now be explained in detail with reference to FIG. 2. FIG. 2 is a block diagram showing the structure of digital camera 1.

As shown in FIG. 2, digital camera 1 houses a CPU 21 which serves as a camera controller for directing control over the camera as a whole by driving and controlling various control elements that will be explained below. This CPU 21 manages the operating mode of digital camera 1. The main operating modes are: photography mode, for photographing the target subject; playback mode for expanding the image data recorded in memory card 39 and playing it back for display on LCD display 2; and a communication mode for communicating with the printer and enabling sending of image data when the digital camera and the printer are directly connected via a USB cable. Note that while a more detailed description will follow below, when switching to the aforementioned communication mode, image data can be expanded and played back for display on LCD display 2, with these images then viewed, selected for printing and sent to the printer. CPU 21 also manages the ON/OFF of the main power supply.

In this digital camera 1, the target image is taken up through photography lens 22 and stop 23, and the target image is converted to an electric signal at a photographing element 29, such as a CCD. This photography lens 22 can be driven forward or back by lens driver 24. Stop 23 is driven by stop driver 25. These drivers 24,25 are controlled by CPU 21.

Figure 3A:
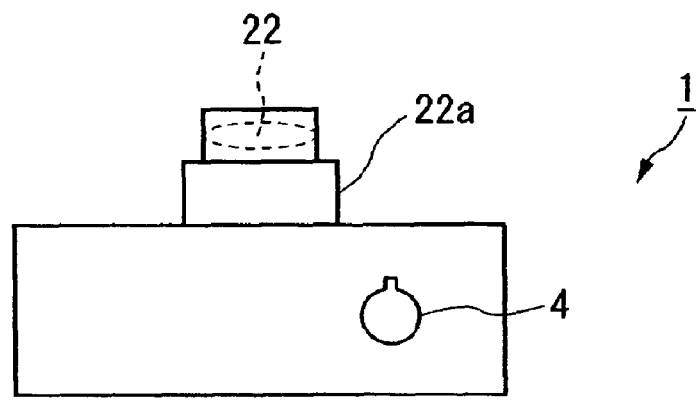
FIG. 3A is a planar view of a digital camera 1 in which the lens is in the projecting position.
Figure 3B:
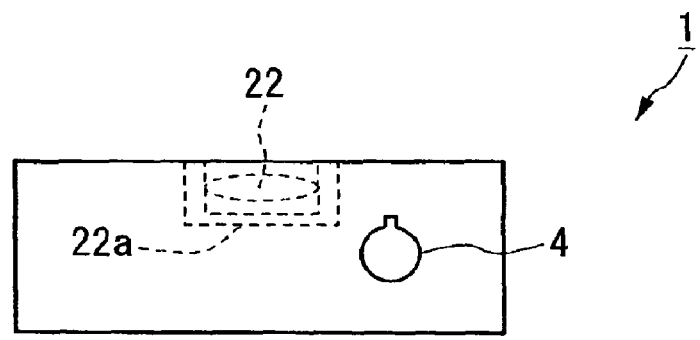
FIG. 3B is a planar view of a digital camera 1 in which the lens is in the collapsed position.

Photography lens 22 is housed inside lens barrel 22a as shown in FIG. 3. This lens barrel 22a has a two-stage structure. During non-photography times, lens barrel 22a folds up and collapses into the body of digital camera 1, while during photography, lens barrel 22a projects out from the collapsed position to the photograph ready position on the front face of the camera body. FIG. 3A is a planar view of digital camera 1 when the photography lens is projecting outward. FIG. 3B is a planar view of digital camera 1 when the photography lens is collapsed.

Lens barrel 22a is driven to advance by lens driver 24 so that it projects out from inside digital camera 1 to the photograph ready position on the front face of the main body of the camera as shown in FIG. 3A. In addition, lens barrel 22a which is projecting out from the photograph ready position on the front face of the camera main body is driven to retract by lens driver 24 so that it collapses to the collapsed position inside the camera as shown by FIG. 3B. The projection of lens barrel 22a is carried out when shifting to the photography mode. For example, when the main power supply is turned ON, the camera automatically shifts to the photography mode, and the projection of lens barrel 22a is carried out with this timing. On the other hand, collapse of lens barrel 22a is typically carried out when the power supply is turned OFF. The timing for collapsing lens barrel 22a at times other than when the main power supply is turned OFF will be explained below.

Photographing element 29 is driven via photographing element driver 28 in a state such that it is synchronized with CPU 21 according to a timing circuit 27. The photography output from photographing element 29 is taken up by digital processing circuit 32 as digital image data by process circuit 30 and A/D converting circuit 31. The digital image data output from digital processing circuit 32 is stored in frame memory 34 after passing through a bus line under the control of memory controller 33. Further, image data that is stored in frame memory 34 passes through the bus line and is recorded with each photography coma in memory card 39 that is attached to the card connector via card I/F 38. Header information for the image data is recorded in correspondence with the image data of each photography coma. Image data which has undergone digital image processing at digital processing circuit 32, image data recorded in memory card 39, or image data printed at printer 10 which will be explained below, and the image selection screen when printing to printer 10, and printer information such as the number of prints, are disposed on LCD display 2. In this case, the image data is supplied to LCD display 2 via the bus line and LCD driver 42, and the printer information is supplied to LCD display 2 by LCD driver 42 based on the program stored in ROM 37 which will be explained below.

ROM 37 and RAM 36 are connected to the bus line. ROM 37 stores the programs for CPU 21, which serves as a camera controller, to control camera photographing and playback operations overall, the firmware for sending image data to printer 10, and the program for LCD driver 42 to display the printing directive screen on LCD display 2. RAM 36 temporarily stores the data during distance or light measurements that are taken up during photography.

Note that the image data supplied to LCD display 2 is also temporarily stored in frame memory 34.

In addition to the above, a release switch button 4, cross key switch 7 for various settings, dial switch 5 for turning on the power supply or setting modes, switch input circuit 41 for menu selecting switches 6, etc., USB controller 35 for connecting to USB connector 8, and strobe emitter 26, etc. are connected to CPU 21. USB controller 35 sends and receives data according to USB protocol via USB cable 9 that is connected to USB connector 8.

As a result, CPU 21 can carry out PTP (Picture Transfer Protocol) communication via the USB, which is used as the physical communication layer, and can detect printer 10 which is connected via USB cable 9. This detection of printer 10 is carried out USB controller 35 detecting the power source supply voltage 5V from USB.

Figure 4:
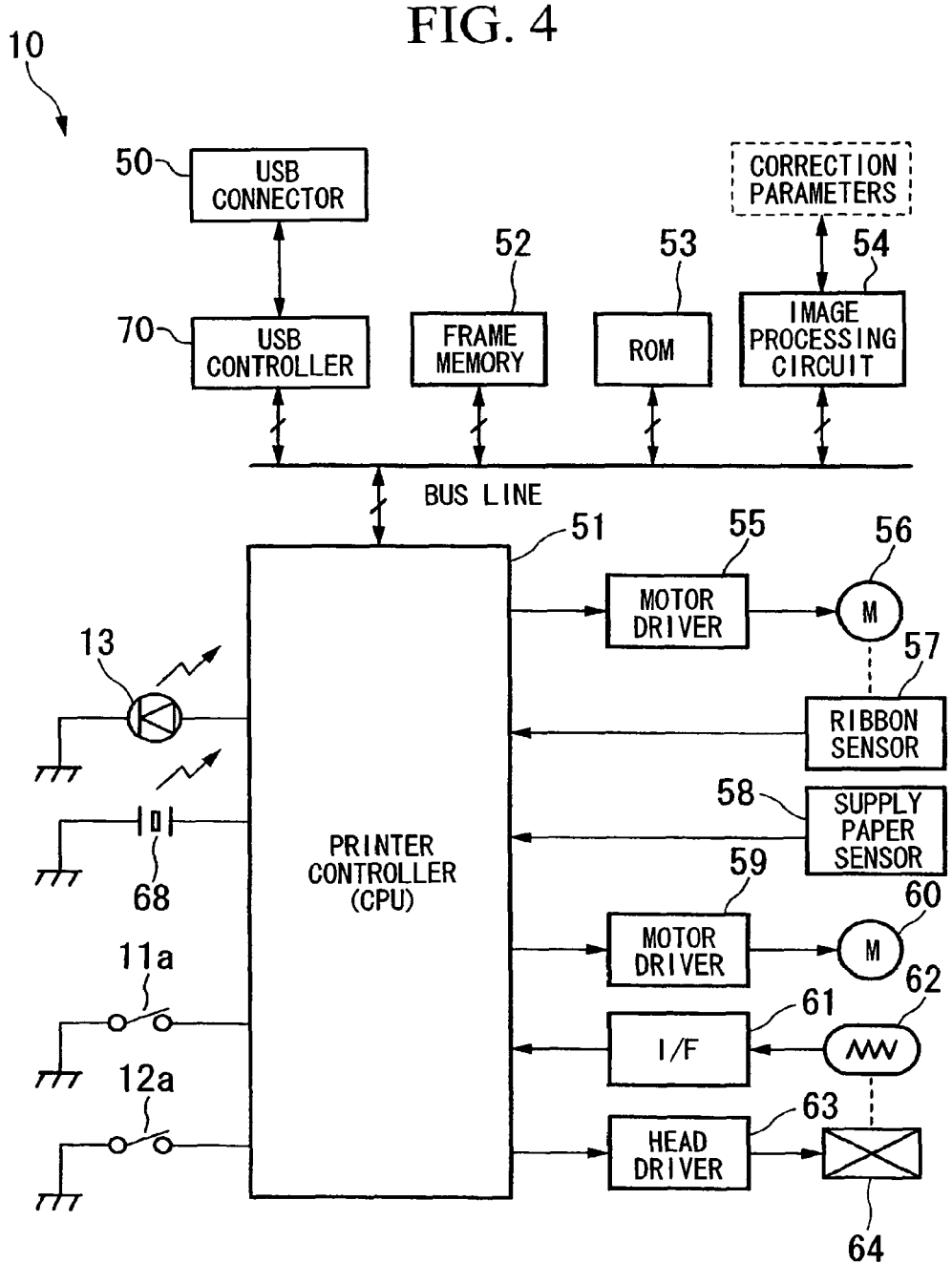
FIG. 4 is a block diagram showing the structure of printer 10 which is connected via USB with digital camera 1.
Figure 5:
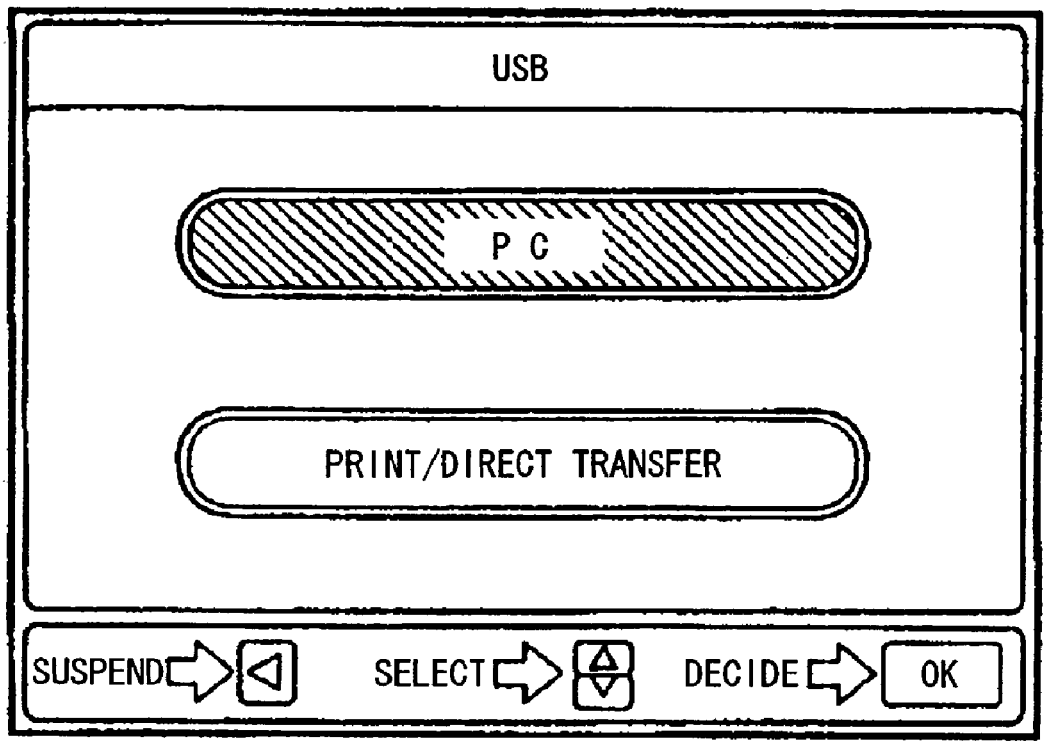
FIG. 5 is a view showing an example of the display on the USB communication method selection screen.

Next, the structure of printer 10 will be explained in detail with reference to FIG. 4. FIG. 4 is a block diagram showing the structure of printer 10, which is one example of an external device that is USB connected to digital camera 1.

As shown in FIG. 4, printer 10 is a frame sequential method thermal dye sublimation printer that employs an ink ribbon consisting of Y (yellow), M (magenta) and C (cyan). Printer 10 houses a CPU 51 as a printer controller for controlling various control elements, explained below, according to printer control programs that are stored in ROM 53. In printer 10, image data and header information and the like which are recorded in digital camera 1 pass through USB connector 50 which is connected via USB cable 9, and are taken up by CPU 51 and frame memory 52 via USB controller 70 and the bus line.

Based on correction parameters at image processing circuit 54, image data which is stored in frame memory 52 undergoes various processing such as color conversion from RGB to CMY, dot/inch size conversion, γ conversion, color correction, thumbnail conversion, frame synthesis, etc. Conversion output data from image processing circuit 54 is output to print head (thermal print head) 64 via head driver 63 under the control of CPU 51.

Meanwhile, ribbon feeding motor (M) 56 and paper supplying motor (M) 60 are driven via motor drivers 55,59 in synchronization with the printing operation of print head 64, and the ink ribbon and paper are relayed, so that printing to the paper is carried out.

The ink ribbon feeding state is detected by ribbon sensor 57, and data on the amount of ink ribbon remaining is taken up by CPU 51. Data on the number of pieces of paper remaining that are housed in the paper cassette which holds the paper is detected by supply paper sensor 58 and taken up by CPU 51. An LED 13 which displays the operating state of the printer, warnings during printer operation, etc., a PCV (piezoelectric buzzer) 68, which is a warning device for generating warning sounds during printer operation, and switch contacts 11a,12a, which are turned ON by printer power supply switch 11 and print initiating switch 12, are disposed to printer 10 and are respectively connected to CPU 51.

Further, ROM 53 is connected to the bus line. Programs for communication operations with digital camera 1 and for operating the printer overall are stored in ROM 53.

Next, the operations during image printing in the above-described design will be explained.

First, when USB connector 8 of digital camera 1 is connected via USB cable 9 and USB connector 50 of printer 10, CPU 21 of digital camera 1 detects the voltage (5V) supplied from printer 10 via USB connector 50. Further, in response to this detection, CPU 21 of digital camera 1 controls LCD driver 42 and displays the printing directive screen on LCD display 2 after reading out the program for displaying the printing control screen from ROM 37. By operating the cross key switch 7 etc. while referring to the printing directive screen, the desired print directive is enabled. When CPU 21 of digital camera 1 receives the signal associated with the print directive, the corresponding image data is read out from memory card 39 which is present in an attachable/releasable manner, and is sent to printer 10 via USB controller 35, USB connector 8, and USB cable 9. In place of this, it is also acceptable to request printer 10 to acquire the image file. Next, CPU 51 of printer 10 initiates the print output of the image file acquired from digital camera 1. As a result, print output of the image file is executed.

The user is able to direct printing of multiple images simultaneously here. CPU 21 of digital camera 1 sequentially sends multiple image files that the user has directed to be printed to printer 10. Alternatively, the user may also request that these multiple image files be sequentially acquired at printer 10.

The confirmation sequence when connecting USB cable 9 will now be explained. A 5V power supply line, referred to as a VBUS, a GND wire, and a total of 4 wires, including the two signal wires D+ and D−, are included in USB cable 9, which is attached and released using an exclusive connector. Digital camera 1 monitors the voltage level of the VBUS in order to confirm the connection with printer 10, which is an external device. When the VBUS voltage is detected, CPU 21 of digital camera 1 determines that USB cable 9 is connected.

When an interruption in the VBUS voltage is detected, CPU 21 of digital camera 1 determines that the USB cable 9 connection has been released.

Meanwhile, a PC, printer 10 or other such external device monitors for pull-up on D+ or D− signal conductor in order to detect connection with digital camera 1. When digital camera 1 is connected to printer 10 which is the external device, it detects that USB cable 9 is connected by detecting the voltage of the VBUS, but does not immediately establish communications, since it does not carry out D+, D− pull-up. Accordingly, printer 10 which is the external device does not recognize a connection with digital camera 1.

During this time, digital camera 1 automatically displays a screen (the screen in FIG. 5) to prompt selection of the USB class (printer or PC) on the UI screen (user interface) in response to changes in the voltage value of VBUS which is provided from printer 10, the external device. The user can select the printer 10 as the desired external device on the UI screen. The UI screen is displayed on LCD display 2. Note that in the screen example in FIG. 5, a PC is selected as the USB class.

By automatically generating a USB class descriptor according to the user selection and performing D+ or D− pull up, digital camera 1 provides confirmation of the connection with the external device, printer 10, to the user. As a result, printer 10 recognizes the connection with digital camera 1 and carries out the desired communication necessary to establish the USB protocol.

Once communications are established in this way, the type of external device that is connected, including confirmation to the user, is displayed on the UI screen. Thereafter, the user can begin operations to perform the desired work.

Next, the sequence for reaching a state in which printing can be executed in the PictBridge system will be explained.

In the PictBridge system, PTP (Picture Transfer Protocol) is employed for the communication protocol for transferring data between devices that are connected via USB cable 9. PTP is employed as the transport layer communication protocol, and USB is employed for the physical communication layer. Further, a DSP layer, which is a converting layer, is provided between the PTP transport layer and the DPS application layer, and carries out mapping with PTP. The DPS layer is provided with a DPS discovery function, in which each device connected to the USB mutually recognizes whether or not they have a DPS function.

First, after connecting the USB cable, a USB protocol is established between the devices connected via USB cable 9, after which processing to establish PTP communication is carried out. Next, after establishing a communication connection between the devices using PTP, DPS discovery is executed. Next, by establishing DPS discovery, control of both devices is shifted to the DPS application. As a result, image printing using the PictBridge system can be executed.

Next, the method for controlling the operation of digital camera 1 according to this embodiment will be explained.

Figure 6:
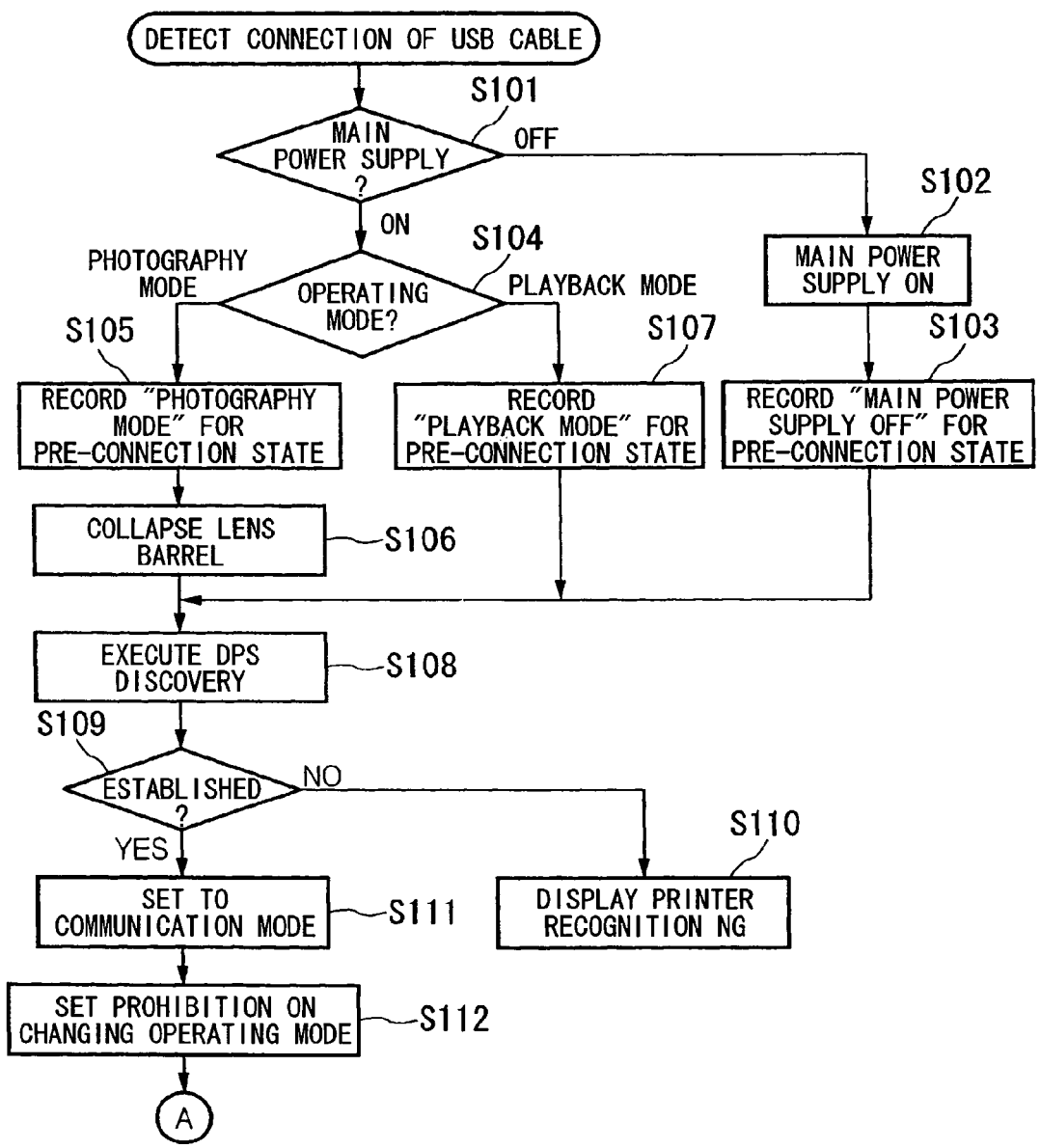
FIG. 6 is a flow chart showing the flow in a first example of the operation control processing during connection with USB cable 9 in this embodiment.
Figure 7:
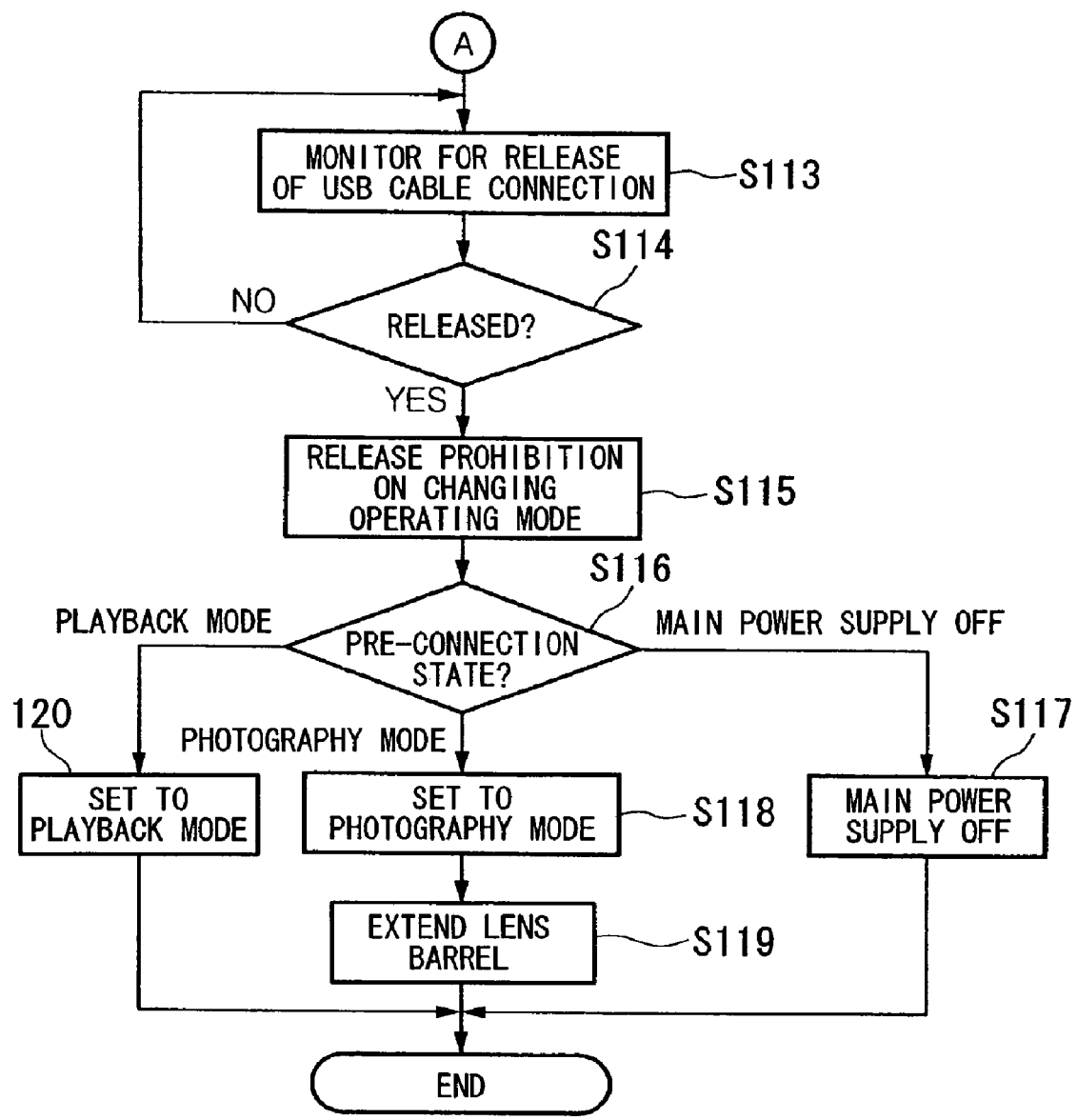
FIG. 7 is a flow chart showing the flow in a first example of the operation control processing during connection with USB cable 9 in this embodiment.

The first example will first be explained with reference to FIG. 6 and FIG. 7. FIG. 6 and FIG. 7 are flow charts showing the flow in the first example of operation control processing during connection of USB cable 9 in this embodiment.

CPU 21 of digital camera 1 detects that USB cable 9 is connected by detecting the voltage of the VBUS, and initiates the processing in FIG. 6. First, in step S101, CPU 21 confirms the ON/OFF of the main power supply currently. If, from the results of this confirmation, the main power supply is OFF, then the main power supply is set to ON, and "main power OFF" is written into a specific recording region in RAM 36 which records the operating state prior to cable connection (hereinafter referred to as "pre-connection state recording region") (steps S102, S103).

On the other hand, if the main power supply is ON, then, in step S104, CPU 21 confirms the current operating mode. When the results of this confirmation indicate that the current operating mode is the photography mode, then CPU 21 writes "photography mode" into the pre-connection state recording region (step S105). Further, lens barrel 22a is collapsed into the body of digital camera 1 by controlling lens driver 24 (step S106). When the results of the confirmation in step S104 indicate that the current operating mode is the playback mode, CPU 21 writes "playback mode" into the pre-connection state recording region (step S107).

Next, in step S108, CPU 21 executes DPS discovery.

In the case where this result indicates that DPS discovery has not been established (step S109 is NO), CPU 21 displays a message that the printer cannot be recognized on the screen of LCD 2 (step S110).

On the other hand, in the case where this result indicates that DPS discovery has been established (step S109 is YES), then CPU 21 sets the operating mode to communication mode (step S111). Further, operating mode changes are prohibited, thereby fixing the operating mode to the communication mode (step S112). As a result, manipulations to change the operating mode are rendered ineffective. Thus, the user need not be concerned that a mistaken operation on his part could change the operating mode, thereby allowing image printing in the PictBridge system to be carried out without concern.

Next, in step S113 in FIG. 7, CPU 21 monitors for the release of the USB cable connection. When CPU 21 detects the release of the USB cable connection (step S114 is YES), it releases the prohibition on operating mode changes (step S115). Next, in step S116, CPU 21 reads out the operating state prior to connection of the cable that is recorded in the pre-connection state recording region in RAM 36, and carries out processing to return to that operating state. Specifically, if the operating state prior to cable connection was "main power supply OFF," then the main power supply is turned OFF (step S117). If the operating state prior to cable connection was "photography mode", then the operating mode is set to photography mode (step S118). Lens barrel 22a is extended from the body of digital camera 1 by controlling the lens driver 24 (step S119). As a result of this extension, lens barrel 22a projects out from the body of digital camera 1, to enable photography. Further, if the operating state prior to cable connection was "playback mode", then the operating mode is set to playback mode (step S120).

In the above-described first example, once the operating mode has shifted to the communication mode as a result of a communication connection with printer 10, the external device, changing the operating mode is prohibited. Accordingly, accidental shift to another mode due to manipulations by the user is prevented when the system is in communication mode. As a result, communication processing with printer 10 can be carried out stably.

Following shifting to the communication mode as a result of the communication connection with the external device, printer 10, once this communication mode state is released, the system automatically returns to the mode it was in immediately before shifting to the communication mode, so that the next operation can be carried out smoothly. As a result, it is possible to provide a digital camera with good operability.

Lens barrel 22a, which is projecting outward, automatically collapses inside the body of the digital camera as a result of connection of the USB cable. As a result, undesirable events such as impacts between the photography lens and an obstacle can be prevented during the printing operation.

In addition, if DPS discovery is established, the system automatically shifts to the communication mode. Thus, it is possible to eliminate the trouble of having the user change the operating mode to the communication mode. In addition, when printing is not possible even though the USB cable is connected, the system does not shift to the communication mode, so that shift to a useless mode is prevented.

In addition, by connecting the USB cable, the main power supply is automatically turned ON, so that the user need not be bothered with the operation to turn ON the main power supply.

Figure 8:
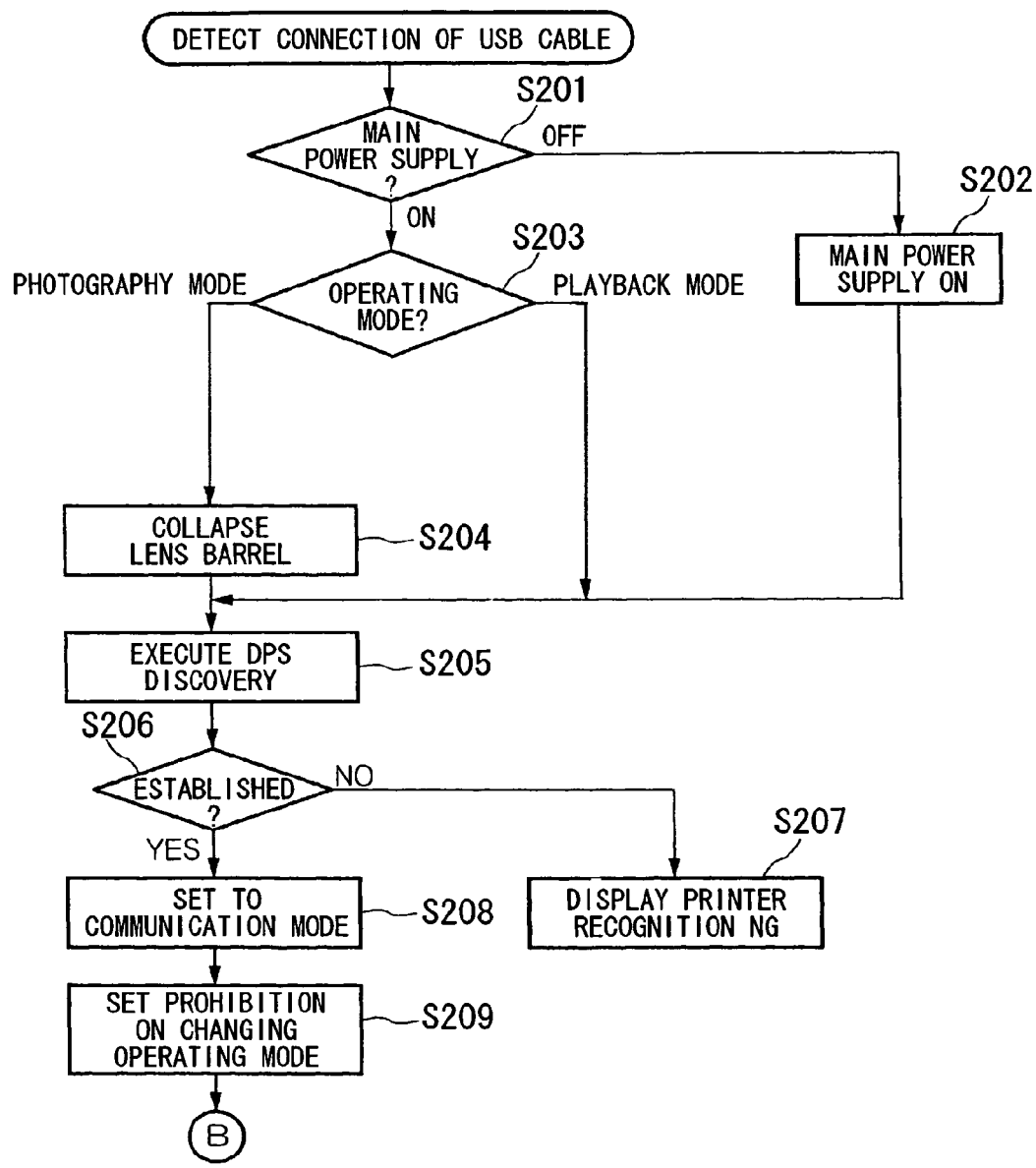
FIG. 8 is a flow chart showing the flow in a second example of the operation control processing during connection with USB cable 9 in this embodiment.
Figure 9:
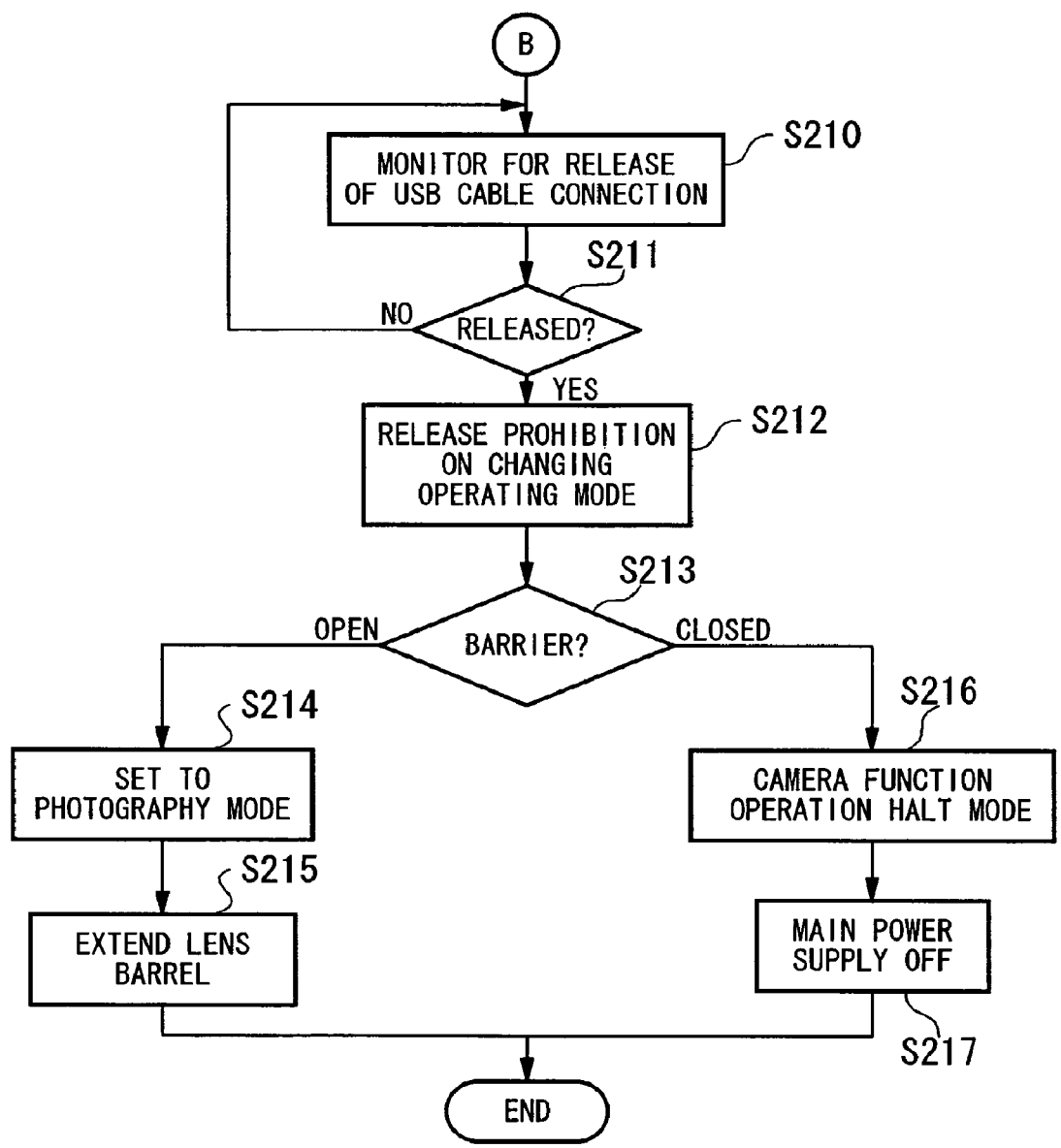
FIG. 9 is a flow chart showing the flow in a second example of the operation control processing during connection with USB cable 9 in this embodiment.

A second example will now be explained with reference to FIG. 8 and FIG. 9. FIG. 8 and FIG. 9 are flow charts showing the flow in a second example of operation control processing during connection of USB cable 9 in this embodiment.

When CPU 21 of digital camera 1 detects that USB cable 9 is connected based on detection of the voltage of the VBUS, it initiates the processing shown in FIG. 8 and confirms the ON/OFF of the main power supply currently (step S201). If the result of this confirmation indicates that the main power supply is OFF, then the main power supply is set to ON (step S202).

On the other hand, if the main power supply is ON, then CPU 21 confirms the current operating mode (step S203). In the case where this result indicates that the current operating mode is the photography mode, then lens barrel 22a is collapsed into the body of digital camera 1 by controlling lens driver 24 (step S204). When the results of this confirmation indicate that the operating mode is the playback mode, then the processing proceeds to step S205 without further modification.

Next, in step S205, CPU 21 executes DPS discovery. When this result indicates that DPS discovery has not been established, (step S206 is NO), then CPU 21 displays the message that the printer cannot be recognized on the screen of LCD 2 (step S207).

On the other hand, when DPS discovery has been established (step S206 is YES), then CPU 21 sets the operating mode to communication mode (step S208). Further, operating mode changes are prohibited, thereby fixing the operating mode to the communication mode (step S209).

Next, in step S210 in FIG. 9, CPU 21 monitors for the release of the USB cable connection. When CPU 21 detects the release of the USB cable connection (step S211 is YES), then it releases the prohibition of operating mode changes (step S212). Next, in step S213, CPU 21 confirms the open/closed state of a lens barrier that is provided to the front face of the body of digital camera 1.

Figure 10A:
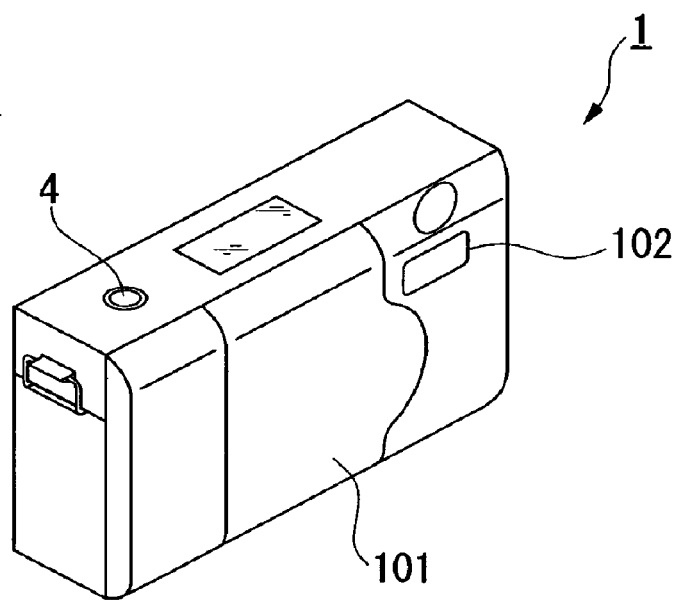
FIG. 10A is a exterior view showing the closed state of lens barrier 101 that is provided to the front face of the main body of digital camera 1.
Figure 10B:
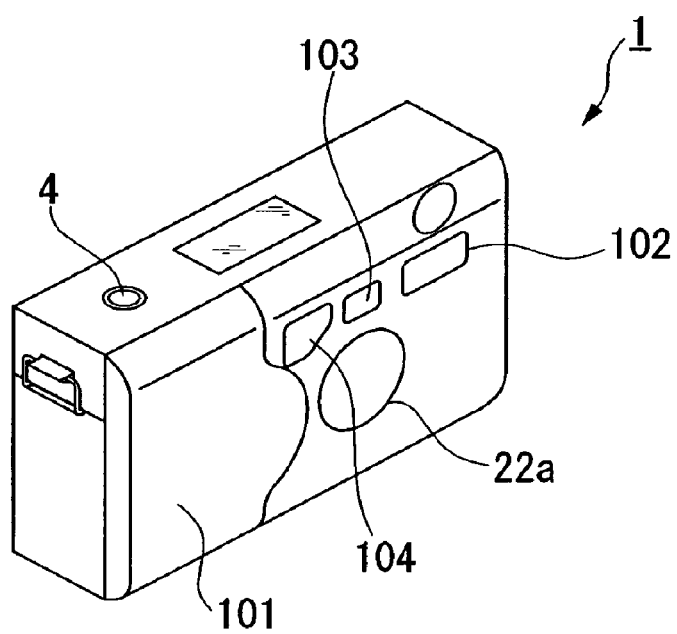
FIG. 10B is a exterior view showing the open state of the same lens barrier 101.

FIG. 10A and FIG. 10B are exterior views showing the open/closed state of lens barrier 101 which is provided to the front face of the body of digital camera 1. FIG. 10A shows the state in which lens barrier 101 is in the closed position covering the photography lens. FIG. 10B shows the state in which lens barrier 101 is in the open position exposing the photography lens. Note that in FIG. 10B, the state shown is one in which lens barrel 22a is collapsed inside the body of digital camera 1 in step S204. When lens barrier 101 is in the open state, flash 102, finder 103 and distance measuring/light measuring window 104, etc. are exposed. Lens barrier 101 can move between the closed position in FIG. 10A and the open position in FIG. 10B.

Next, when lens barrier 101 is in the open state, CPU 21 sets the operating mode to the photography mode (step S214), and lens driver 24 is controlled to extend lens barrel 22a from inside the body of digital camera 1 (step S215). In contrast, when lens barrel 101 is in the closed state, CPU 21 sets the mode to the camera function operation halt mode, and sets the main power supply to the OFF state (steps S216, S217).

In the above-described second example, as in the case of the first example, after shifting to the communication mode due to a communication connection with the external device, printer 10, a change in the operating mode is prohibited. Accordingly, accidental shift to another mode as a result of manipulations by the user is prevented when the system is in communication mode. Further, when the communication mode is released, the system can shift to the operating mode that is appropriate to the position of the lens barrier. As a result, it is possible to provide a digital camera with good operability in which the next operation can be carried out smoothly. Note that in this second example, lens barrier 101 corresponds to a mode selecting device.

Figure 11:
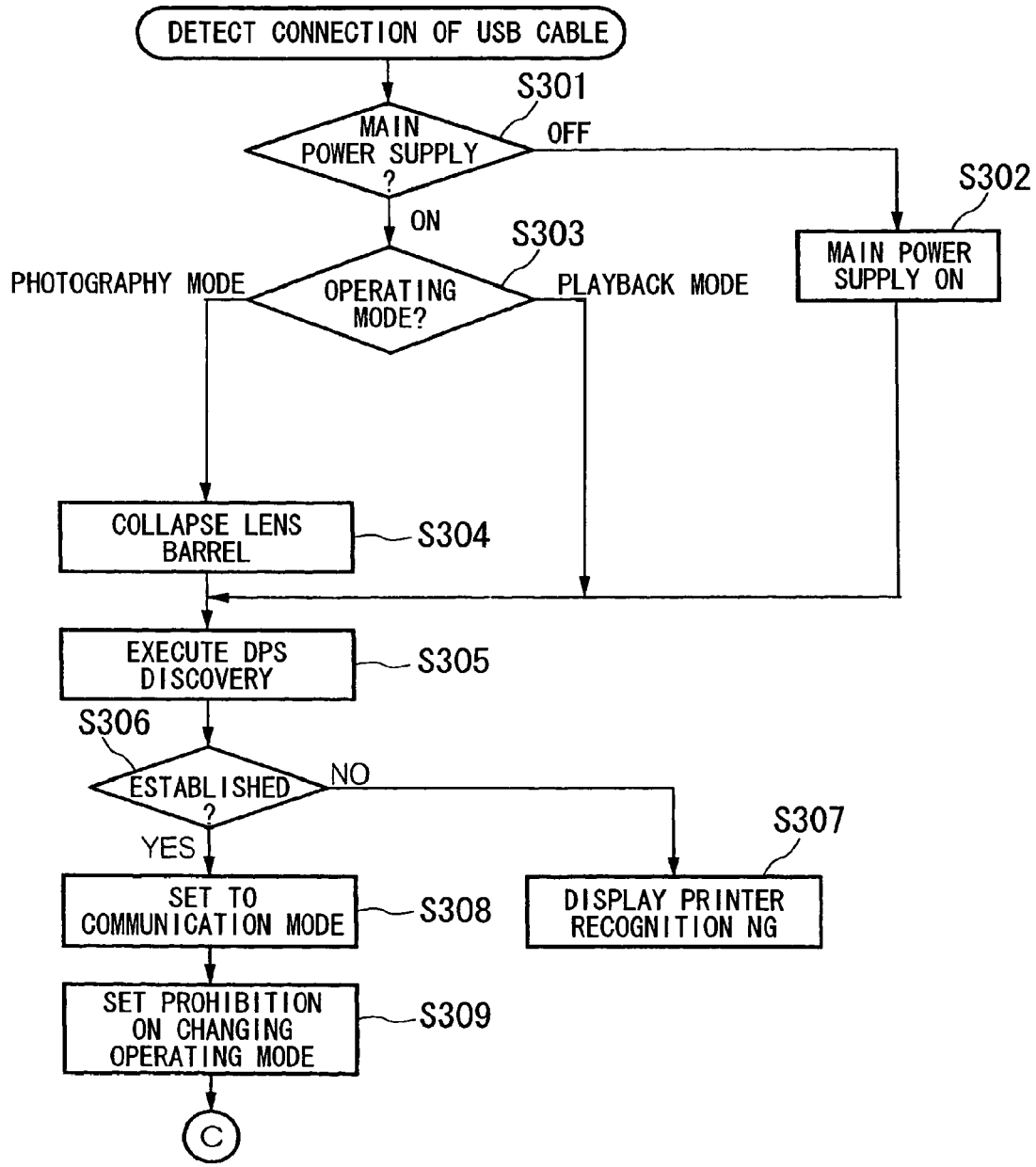
FIG. 11 is a flow chart showing the flow in a third example of the operation control processing during connection with USB cable 9 in this embodiment.
Figure 12:
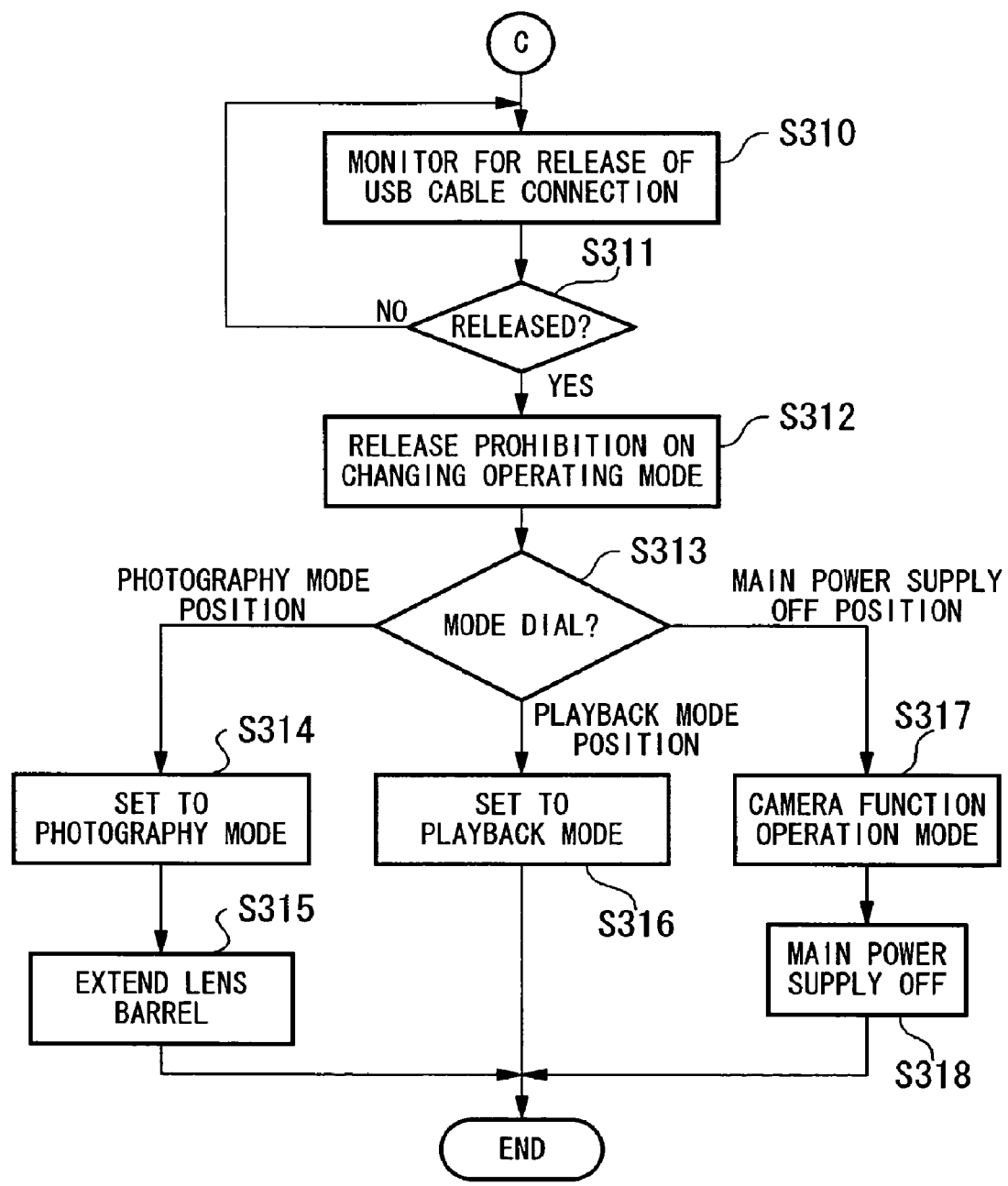
FIG. 12 is a flow chart showing the flow in a third example of the operation control processing during connection with USB cable 9 in this embodiment.

Next, a third example will be explained with reference to FIG. 11 and FIG. 12. FIG. 11 and FIG. 12 are flow charts showing the flow in a third example of operation control processing during connection of USB cable 9 in this embodiment.

The processing in steps S301~S312 shown in FIG. 11 and FIG. 12 correspond to steps S201~S212 in FIG. 8 and FIG. 9 respectively, so that an explanation thereof will be omitted here. Step S313 in FIG. 12 confirms the setting state of dial switch (referred to by the common name "mode dial" hereinafter) 5 (see FIG. 1), which serves as the power supply switch and mode selecting switch, etc., that are provided to the rear face of the body of digital camera 1.

Next, when mode dial 5 is set to the photography mode position, CPU 21 sets the operating mode to photography mode (step S314), and extends lens barrel 22a from inside the body of digital camera 1 by controlling lens driver 24 (step S315). When mode dial 5 is set to the playback mode position, CPU 21 sets the operating mode to playback mode (step S316). When mode dial 5 is set to the main power supply OFF position, CPU 21 shifts the operating mode to the camera function operation halt mode and sets the main power supply to the OFF state (step S317, S318).

In the above-described third example, as in the case of the preceding examples, after shifting to the communication mode due to a communication connection with external device, printer 10, changing the operating mode is prohibited. Accordingly, accidental shift to another mode as a result of manipulations by the user is prevented when the system is in communication mode. Once this communication mode state is released, the operating mode can be matched to the setting of mode dial 5. As a result, the next operation can be carried out smoothly, making it possible to provide a digital camera with good operability. Note that in this third example, dial switch (mode dial) 5 corresponds to a mode selecting device.

Note that in the preceding embodiment, the establishment of a communication connection with an external device was prescribed as the condition for setting the operating mode to the communication mode. However, it is also acceptable to prescribe the connection of the USB cable as the condition for setting the operating mode to the communication mode.

In the above-described embodiment, USB controller 35 and CPU 21 correspond to a signal receiving device and a communication state recognizing device. Further, CPU 21, etc. correspond to a mode setting device, shift prohibiting device, operating mode confirming device, barrel controlling device, and mode resetting device. Further, RAM 36 etc. corresponds to the recording device.

Next, a second embodiment concerning the present invention's photographing apparatus, printer, printing system, and control method for the lens barrel will be explained with reference to FIG. 13 and FIG. 14. Note that this invention is established onto the same device structures as the direct print system explained in the first embodiment, thus, an explanation for these device structures will be omitted in this embodiment.

A first example of an operation in which CPU 21 of digital camera 1 drives and controls lens barrel 22a according to this embodiment will be explained with reference to FIG. 13. FIG. 13 is a flow chart showing the flow of an example of processing when connecting USB cable according to this embodiment.

Figure 18:
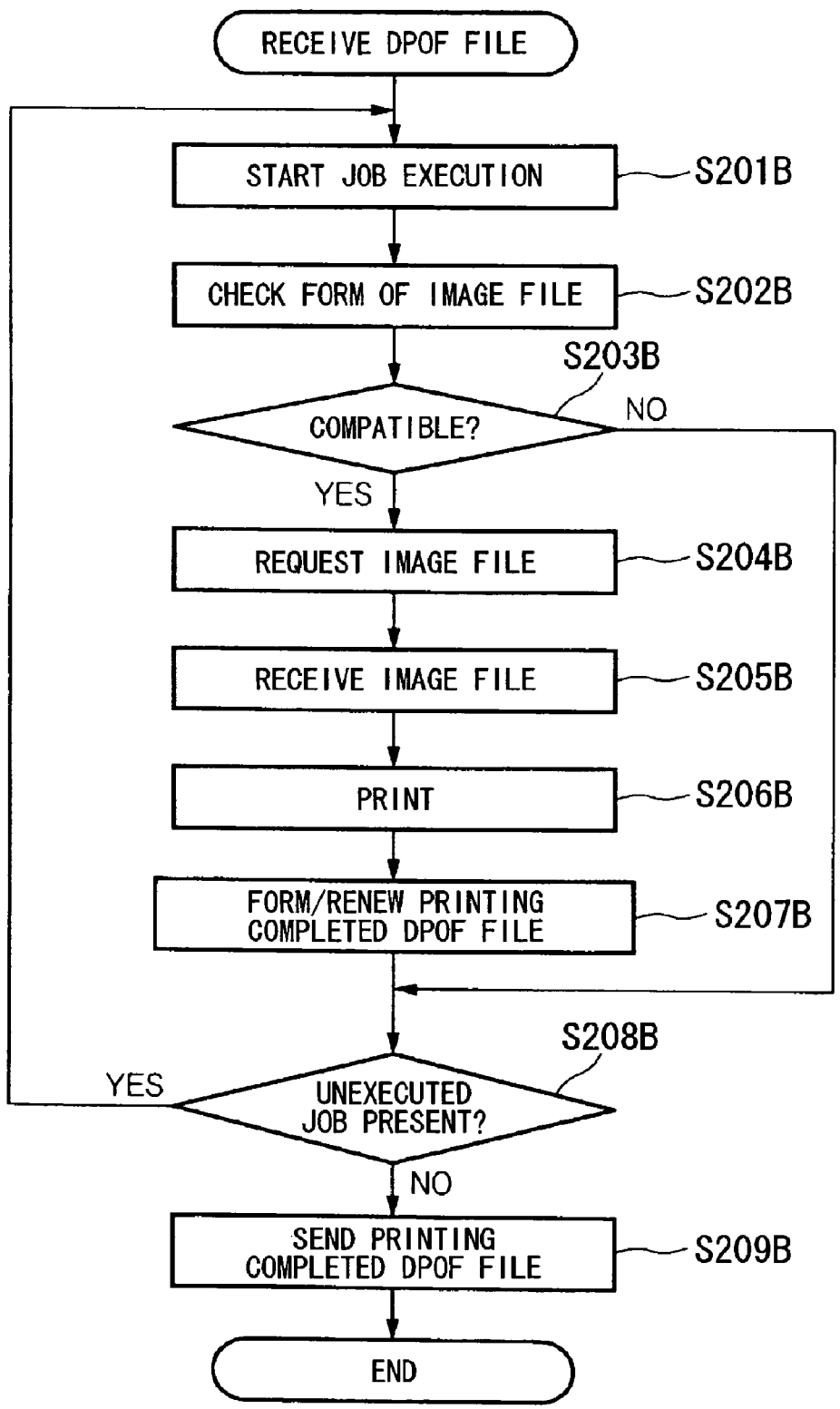
FIG. 18 is a flow chart showing a second example of printing control processing in printer 10 shown in FIG. 4

When CPU 21 of digital camera 1 detects that USB cable 9 is connected by detecting the voltage of VBUS, it initiates the processing shown in FIG. 18. First, CPU 21 confirms the current operating mode (step S101A). If, from the results of this confirmation, the current operating mode is the photography mode, then CPU 21 collapses lens barrel 22a into the body of digital camera 1 by controlling lens driver 24 (step S102A).

Next, CPU 21 displays the USB communication method selection screen (see FIG. 5) on the UI screen (step S104A), and the user selects printer or PC as the desired communication method according to the USB communication method selection screen. Next, if the printer (image class) is selected by the user, then CPU 21 initiates communication with printer 10, which is connected via USB cable 9, using the direct print communication method (step S105A, S106A).

On the other hand, if the user selects a PC (storage class) as the external device, CPU 21 initiates USB class communication with the PC which is connected via USB cable 9 using a storage communication method (step S107A, S108A). After establishing communications with the PC, operations are performed such as sending image data stored in digital camera 1 to the PC by manipulations from the PC (step S109A). In step S110A, a judgment is made as to whether or not communication between the PC and digital camera 1 are finished, and, if completed, the processing in FIG. 13 is terminated.

Figure 13:
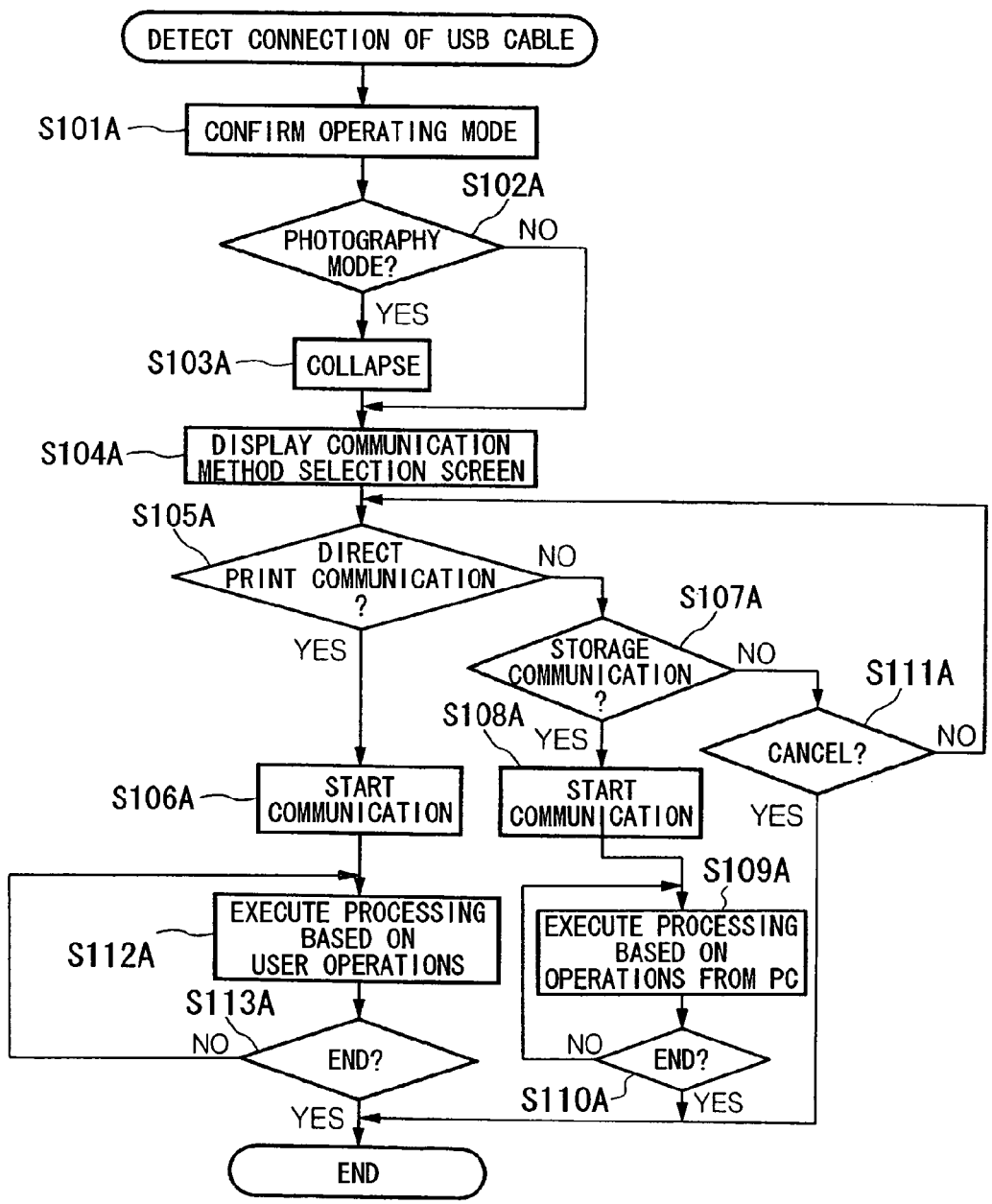
FIG. 13 is a flow chart showing the flow in one processing example during connection with USB cable 9 in digital camera 1 according to a second embodiment of the present invention.

When the initiation of communications is cancelled by the user, the processing in FIG. 13 is terminated (step S111A).

Next, after initiating communication with printer 10 in step S106A and establishing the communication connection, CPU 21 executes image file output processing based on operations by the user (step S112A). For example, print output of the image file by printer 10 is carried out.

Next, once image file output processing is completed, CPU 21 ends the processing in FIG. 13 (step S113A). Termination of image file output processing includes normal termination and abnormal termination such as due to pulling out of the cable, etc.

In the first example explained above, lens barrel 22a automatically collapsed into the body of digital camera 1 when USB cable 9 was connected and a specific output was detected from the external device, printer 10, in the photography mode. As a result, even if user operations are carried out with USB cable 9 in the connected state, lens barrel 22a does not come into contact with obstacles, so that it is possible to prevent impacts between the lens and an obstacle.

Next, a second example of an operation in which CPU 21 of digital camera 1 drives and controls lens barrel 22a according to this embodiment will be explained with reference to FIG. 14. FIG. 14 is a flow chart showing the flow of an example of processing when connecting USB cable 9 according to this embodiment.

When CPU 21 of digital camera 1 detects that USB cable 9 is connected by detecting the voltage of VBUS, it initiates the processing shown in FIG. 18. First, CPU 21 confirms the current operating mode (step S201A). Next, CPU 21 displays the USB communication method selection screen (see FIG. 5) on the UI screen (step S202A), and the user selects printer or PC as the desired communication method according to the USB communication method selection screen. Next, if printer (image class) is selected by the user, then CPU 21 initiates communication (PTP communication) with the external device, such as printer 10, a PC, etc., that is connected via USB cable 9, using the direct print communication method (step S203A, S204A).

In the direct print communication method here, PTP (Picture Transfer Protocol) is employed in the communication protocol for sending data. PTP is employed as the transport layer communication protocol, and USB is employed for the physical communication layer. Further, a DSP layer, which is a converting layer, is provided between the PTP transport layer and the DPS application layer, and carries out mapping with PTP. The DPS layer is provided with a DPS discovery function, in which each device connected to the USB mutually recognizes whether or not they have a DPS function. DPS discovery is automatically carried out after establishing a communication connection using PTP between both devices. Next, by establishing DPS discovery, control of both devices is transferred to the DPS application. As a result, it becomes possible to execute image printing using the PictBridge system.

Next, once a PTP communication connection with the external device has been established and DPS discovery has been realized, when the result of the confirmation in step S201A indicates that the operating mode is the photography mode (steps S205A and S206A are YES), CPU 21 collapses lens barrel 22a into the body of digital camera 1 by controlling lens driver 24 (step S207A). On the other hand, in the case where DPS discovery has not been established, or when a mode other than the photography mode is confirmed in step S201A (steps S205A or S206A are NO), then CPU 21 does not carry out the collapse of lens barrel 22a.

When the user selects a PC (storage class) according to the USB communication method selection screen displayed in step 202A, then CPU 21 initiates USB class communication with the PC that is connected via USB cable 9 using a storage communication method (step S208A, S209A). After establishing a communication connection with the PC, operations are performed such as sending image data stored in digital camera 1 to the PC by manipulations from the PC (step S210A). In step S211A, a judgment is made as to whether or not communication between the PC and digital camera 1 are finished, and, if completed, the processing in FIG. 14 is terminated.

Figure 14:
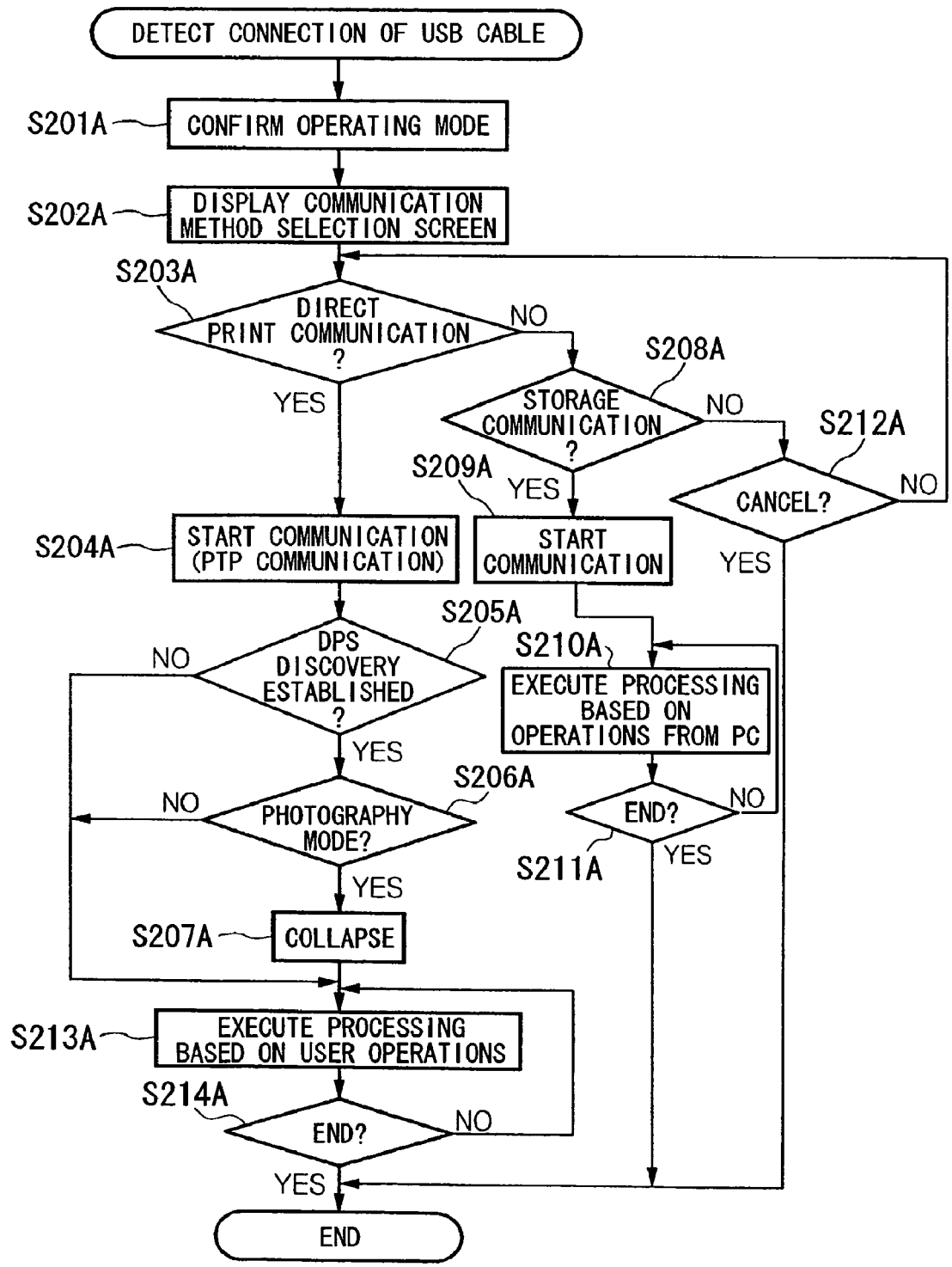
FIG. 14 is a flow chart showing the flow in another processing example during connection with USB cable 9 in digital camera 1.

In contrast, when the user cancels the initiation of communication, the processing in FIG. 14 is terminated (step S212A).

Next, CPU 21 executes image file output processing based on operations by the user in step S213A. For example, CPU 21 executes printing output by printer 10 of the image files for which DPS discovery has been established.

Next, once image file output processing is completed, CPU 21 terminates the processing in FIG. 14 (step S214A). Termination of image file output processing includes normal termination and abnormal termination such as due to pulling out of the cable, etc.

In the second example explained above, lens barrel 22a automatically collapses into the body of digital camera 1 in the case where USB cable 9 is connected during photography mode and it is possible to execute image printing by the external device, printer 10, i.e., when DPS discovery has been established. As a result, during print operations by the user, undesirable accidents such as impacts between the photography lens and an obstacle can be prevented. Further, since collapse of lens barrel 22a is carried out at the time of image printing operations, where connection with the printer is confirmed and there are a particularly high number of manipulations performed by the user, effective accident prevention can be realized, in addition to conserving energy by reducing the number of times the lens barrel is collapsed. For example, when connecting with the PC, the user acquires an image file from digital camera 1A by operating the PC. Thus, there is almost no manipulation of digital camera 1, so that there is little concern that an accident will occur even if lens barrel 22a is projecting outward from the camera body.

Note that in the above-described embodiment, cross-key switch 7A, etc. corresponds to an input device.

Lens barrel 24A, etc., corresponds to a movement mechanism. Further, USB controller 35A and CPU 21A, etc. correspond to signal receiving device, communication state recognizing device, and external device recognizing device (printer recognizing device). In addition, CPU 21A, etc. corresponds to a lens barrel controlling device. USB controller 70A and CPU 51A correspond to an output device and a photographing apparatus recognizing device. CPU 51A, etc. corresponds to a printing control device.

Next, a third embodiment concerning the printer, control method therefore, and printing system according to the present invention will be explained with reference to FIG. 15 through FIG. 22. Note that the present invention is established on to the same device design as the direct print system explained in the preceding first embodiment, so that an explanation of this device design will be omitted in this embodiment.

The case where a request is made to acquire an image file from digital camera 1B to printer 10B will be explained. DPOF (Digital Print Order Format) can be employed in this embodiment as one printing control arrangement employed during this request. FIG. 15 shows an example of a DPOF file (printing control information storing file). In the example in FIG. 15, a request is made for print output of five image files. As shown in FIG. 15, the five print jobs (hereinafter, referred to simply as "jobs") 110B, 120B, 130B, 140B, and 150B are recorded in DPOF file 100B. In addition, printing control information such as the name of the image files to be printed—111B, 121B, 131B, 141B and 151B, etc.—are stored for each job.

Note that "PRT PID" is the number of the image file to be printed, and "PRT TYP" is the print type. The example in FIG. 15 is standard, with "IMG FMT" being the image file form, and "IMG SRC" being the relative path showing where the image file is to be saved.

CPU 21 of digital camera 1B creates a DPOF file for the image file that has been designed for printing. As shown in FIG. 15, the job is recorded in this DPOF file for each print-designated image file, and printing control information such as the file name for the image that is to be printed is recorded for each job.

Figure 16:
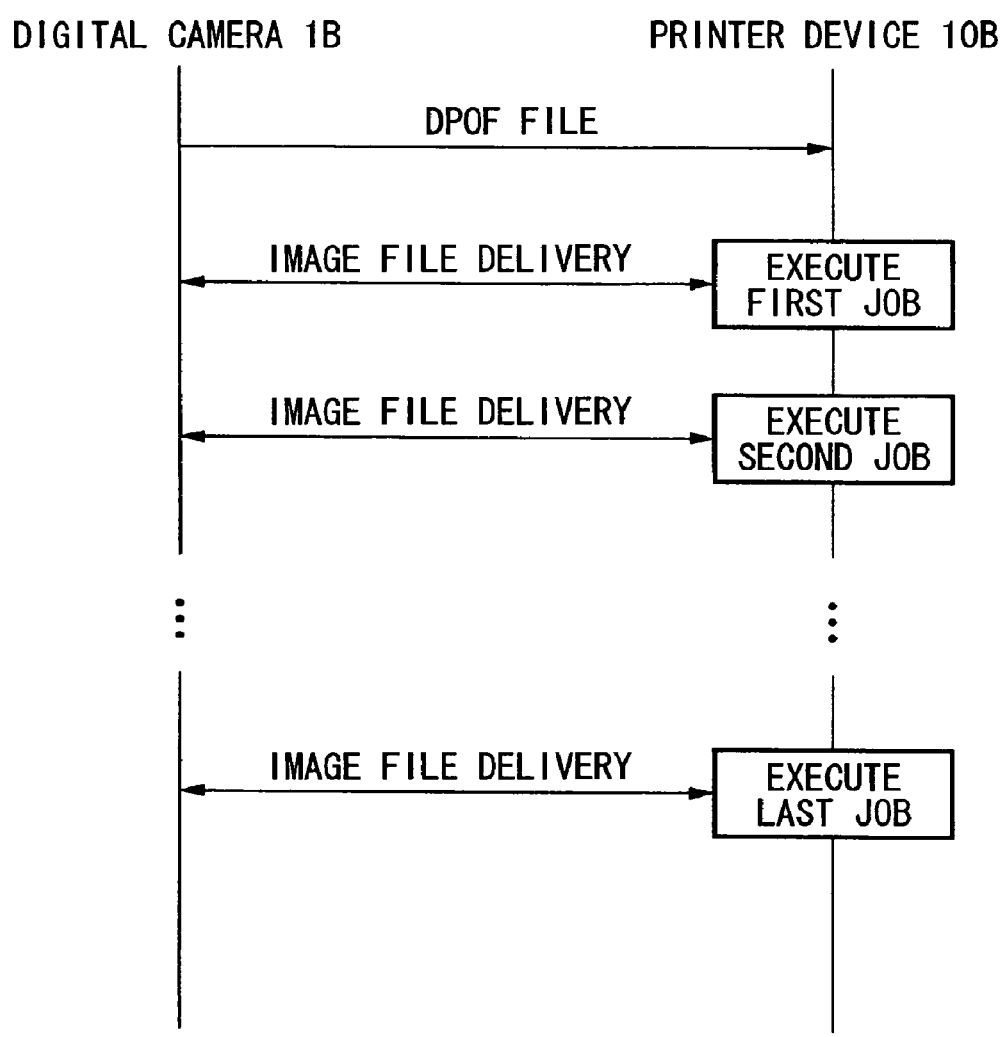
FIG. 16 is a sequence view showing the flow of printing control processing in the image processing system (PictBridge system) shown in FIG. 1.

Next, the operation for acquiring and printing the image file requested by printer 10 from digital camera 1 will be explained with reference to FIG. 16. FIG. 16 is a sequence diagram showing the flow of the printing control information in the PictBridge system in this embodiment. Note that in the following explanation, sending and receiving of data, etc. between digital camera 1B and printer 10 is carried out using a USB connection.

In FIG. 16, first, when a communication connection is established between digital camera 1 and printer 10, CPU 21 of digital camera 1 sends the formed DPOF file to printer 10. Next, CPU 51 of printer 10 executes the jobs recorded in the received DPOF file in sequence from the lead. When executing these jobs, delivery of the image files to be printed is carried out between printer 10 and digital camera 1. Specifically, CPU 51 of printer 10 sends the name of the image file to be printed for the job currently being executed to digital camera 1, and requests the corresponding image file. Next, CPU 21 of digital camera 1 reads out the image file corresponding to the received image file name from memory card 39 for example, and sends this to printer 10. Next, CPU 51 of printer 10 initiates print output of the received image file. As a result, the image file designated for printing in the DPOF file is acquired from digital camera 1 by printer 10, and printed out.

There are various types of image file forms, not all of which may be supported by printer 10, however. For example, five image files are designated for printing in DPOF file 100B shown in FIG. 15. Files in JPEG and TIFF form are included among these. Of these, in the case where printer 10 corresponds to JPEG, but not TIFF, for example, then, if the printer attempts to print out the TIFF image file without modification, the print output cannot be executed normally. Further, when printer 10 experiences an error state, there is a chance that subsequent jobs will not be able to be executed.

Thus, in this embodiment, printer 10 checks in advance the form of the image file designated for printing, and, as a result, does not print out image files that are in a form to which the printer does not correspond.

An explanation will now be made of the operation of printer 10 in the case where the image files designated for printing according to the DPOF file include image files that are in a form that the printer does not support.

Figure 17:
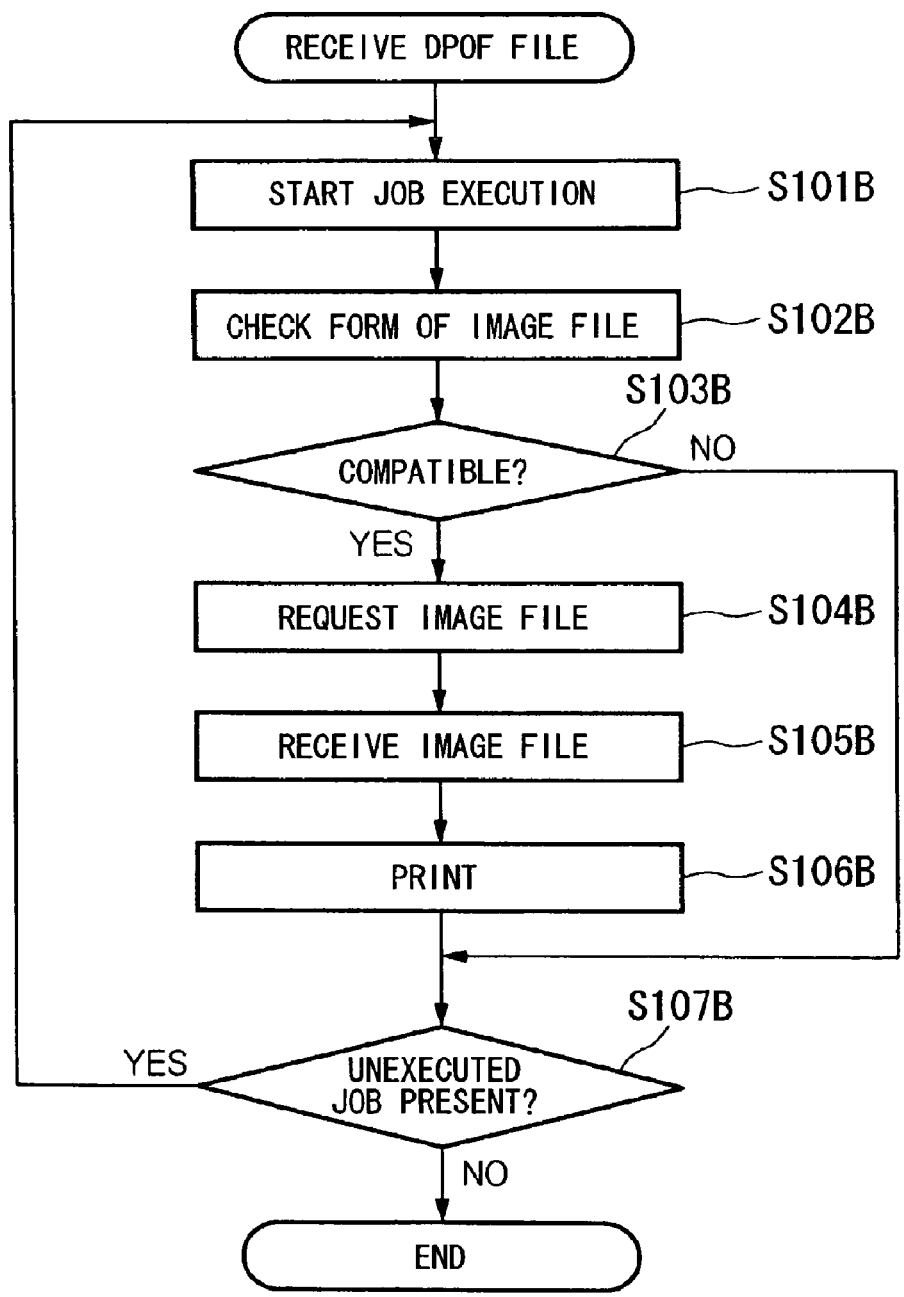
FIG. 17 is a flow chart showing a first example of printing control processing in printer 10 shown in FIG. 4.

A first example of the printing control processing which is carried out by printer 10 in this embodiment will be explained with reference to FIG. 17. FIG. 17 is a flow chart showing a first example of the printing control processing for printer 10 in this embodiment.

In FIG. 17, when CPU 51 of printer 10 receives a DPOF file from digital camera 1, it begins executing the first job recorded in the DPOF file (step S101B). Next, CPU 51 references the name of the image file which is to be printed in the job currently being executed, and confirms the form of this image file (step S102B). In the DPOF file 100B shown in FIG. 15, the extension on the image file name indicates the form of the file. For example, the extension "JPG" indicates a JPEG file, while the extension "TIF" indicates a TIFF file.

Next, CPU 51 judges whether or not the form of the image file to be printed in the job currently being executed is of a desired form that can be printed (step S103B). If the result of this judgment indicates that printing is possible, the process proceeds to step S104B. If, on the other hand, the result of this judgment indicates that printing is not possible, the process proceeds to step S107B.

Next, in step S104B, since a judgement has been made that the image file to be printed in the current job can be printed, CPU 51 requests the image file from digital camera 1 (step S104B). Next, once the image file to be printed is sent from digital camera 1 and received by printer 10, CPU 51 initiates print output of the received image file (step S105B, S106B).

Next, in step S107B, CPU 51 judges whether or not there are any unexecuted jobs from among those recorded in the DPOF file (step S107B). When the result of this judgment indicates that an unexecuted job is present, the process proceeds to step S101B, and the next job is executed. In the case where the judgment is made that there are no unexecuted jobs, then processing concludes.

In the preceding first example, print output of the image file is carried out only in the case where the form of the image file to be printed is in a print-compatible form. As a result, it is possible to prevent print output of an image file that is in a print-incompatible form, and to prevent from the beginning the occurrence of errors due to an unsuitable image file form. As a result, print output of print-compatible image files can be carried out smoothly. In addition, only print-compatible image files are requested and acquired from digital camera 1B, making it possible to shorten the time required to execute printing.

Next, a second example of the printing control process performed by printer 10 in this embodiment will be explained with reference to FIG. 18. FIG. 18 is a flow chart showing a second example of the printing control process in printer 10 in this embodiment.

In FIG. 18, the processing in steps S201B~S206B corresponds to the processing in steps S101B~S106B in FIG. 17, so an explanation thereof will be omitted. In step S207B, CPU 51 of printer 10 newly forms a DPOF file only for image files in which the form of the image file to be printed is print-compatible, and printing output has been completed (hereinafter, referred to as "printing completed DPOF file"). Further, the printing completed DPOF file is renewed each time the printing output of the image file is executed. Recording of the job that is recorded in the original DPOF file received from digital camera 1 is copied in the printing completed DPOF file. Alternatively, it is also acceptable to newly set printing control information other than the image file name for image files for which printing output is completed, and record this set printing control information in the printing completed DPOF file.

FIG. 19 shows an example of a printing completed DPOF file. In the case of printing completed DPOF file 200B shown in FIG. 19, the JPEG form is a print-compatible form and the TIFF form is print-incompatible form in the case where the DPOF file 100B in FIG. 15 is executed. As shown in FIG. 19, in the printing completed DPOF file 200B, only image files in JPEG form are designated for printing. Further, in this example, recording of jobs 110B, 120B, and 140B corresponding to the printing completed DPOF file 100B in FIG. 15 are copied into printing completed DPOF file 200B.

Next, after executing all jobs, CPU 51, sends printing completed DPOF file to digital camera 1 (step S209B). This printing completed DPOF file is stored on digital camera 1 side.

The above-described second example provides the same effects as the first example. In addition, using the printing completed DPOF file, the next printing directive can be carried out easily and with certainty.

Note that in the above-described second example, the printing completed DPOF file is a file in which is stored a list that includes only those image files to be printed that are print compatible.

Figure 20:
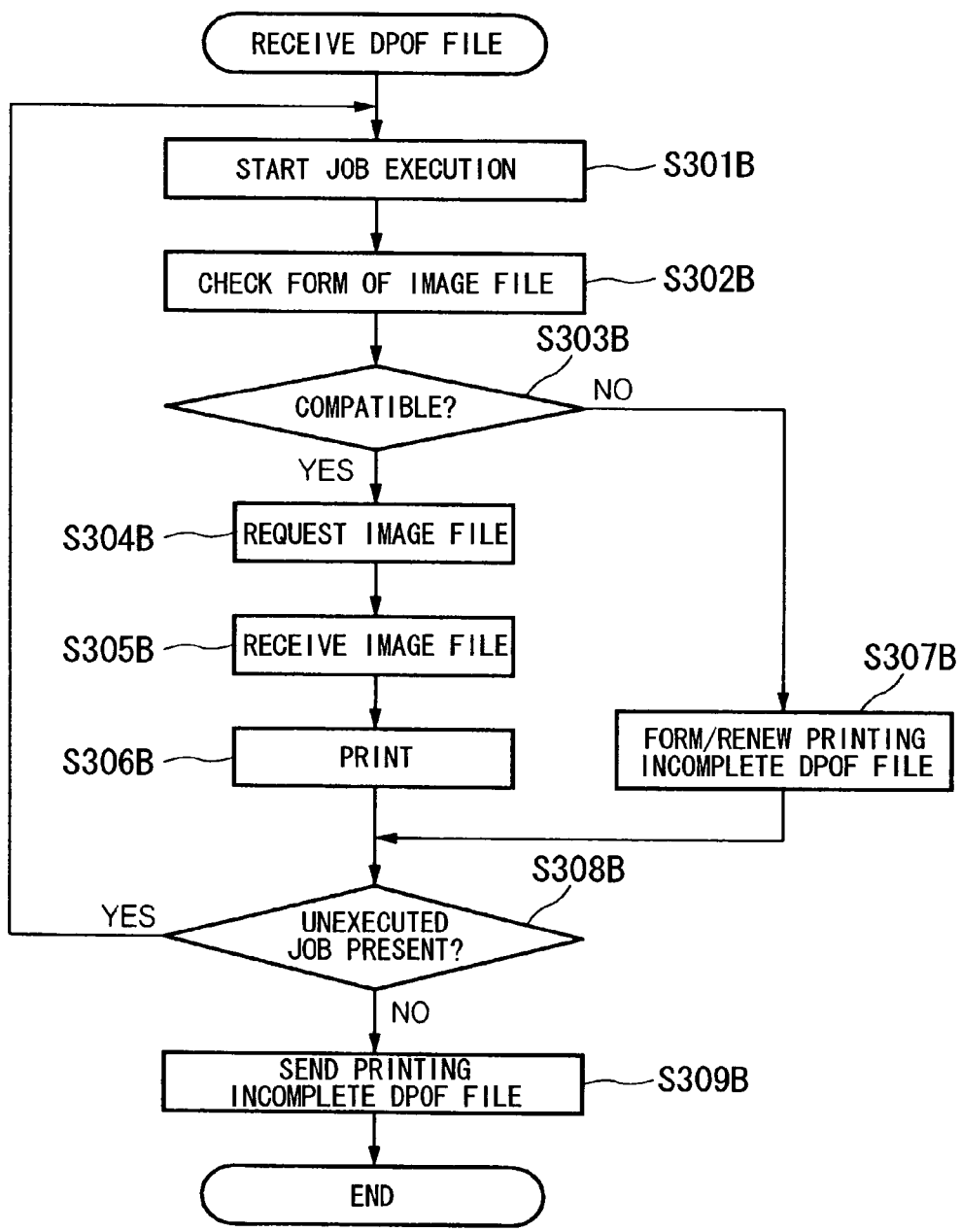
FIG. 20 is a flow chart showing a third example of printing control processing in printer 10 shown in FIG. 4

Next, a third example of the printing control process that is carried out by printer 10 in this embodiment will be explained with reference to FIG. 20. FIG. 20 is a flow chart showing a third example of the printing control process in printer 10 of this embodiment.

In FIG. 20, the processing in steps S301B~S306B correspond respectively to the processing steps S101B~S106B in FIG. 17, so an explanation thereof will be omitted. In step S307B, CPU 51 of printer 10 newly forms a DPOF file for only those image files in which the form of the image files to be printed is print incompatible and which have not undergone printing output (referred to as "printing incomplete DPOF files" hereinafter). Further, the printing incomplete DPOF file is renewed each time an image file that has not been printed out is detected. Recording of the job that is recorded in the original DPOF file received from digital camera 1B is copied in the printing incomplete DPOF file. Alternatively, it is also acceptable that printing control information other than the image file name can be newly set for image files that have not been printed out, and the printing control information set can be recorded in the printing completed DPOF file.

FIG. 21 shows an example of a printing incomplete DPOF file. In the case of printing incomplete DPOF file 300B shown in FIG. 21, the JPEG form is print compatible and TIFF form is print incompatible in the case where the DPOF file 100B in FIG. 15 is executed. As shown in FIG. 21, in the printing incomplete DPOF file 300B, only the image file in TIFF form is designated for printing. Further, in this example, recording of jobs 130B, 150B corresponding to the DPOF file 100B in FIG. 15 are copied into printing incomplete DPOF file 300B.

Next, after executing all, jobs, CPU 51 sends the printing incomplete DPOF file to digital camera 1 (step S309B). This printing incomplete DPOF file is stored on the digital camera 1 side.

The above-described third example provides the same effects as the first example. In addition, using the printing incomplete DPOF file, the printing directive for the unprinted image files can be carried out easily and with certainty. For example, the printing incomplete DPOF files can be supplied to another printer that supports the form of the unprinted image files, and printing can be easily carried out. In addition, it is also possible to request printing from a lab service.

Note that in the above-described third example, the printing incomplete DPOF file is a file in which is stored a list that includes only those image files that are to be printed that are print incompatible.

Note that the printing completed DPOF files and the printing incomplete DPOF files may be stored on the printer 10 side.

Further, it is acceptable to form both printing completed DPOF file and printing incomplete DPOF file in printer 10.

In addition, in the above-described embodiment, CPU 21 of digital camera 1 corresponds to a file supplying device and an image supplying device. In addition, CPU 51 of printer 10, etc. corresponds to a printability judging device, image acquiring device, and a first and second list forming device.

Preferred embodiments of the present invention were explained in detail above with reference to the figures, however, the specific design is not limited to these embodiments. Rather, various design modifications are included, provided that they do not depart from the gist of the present invention.

Figure 22:
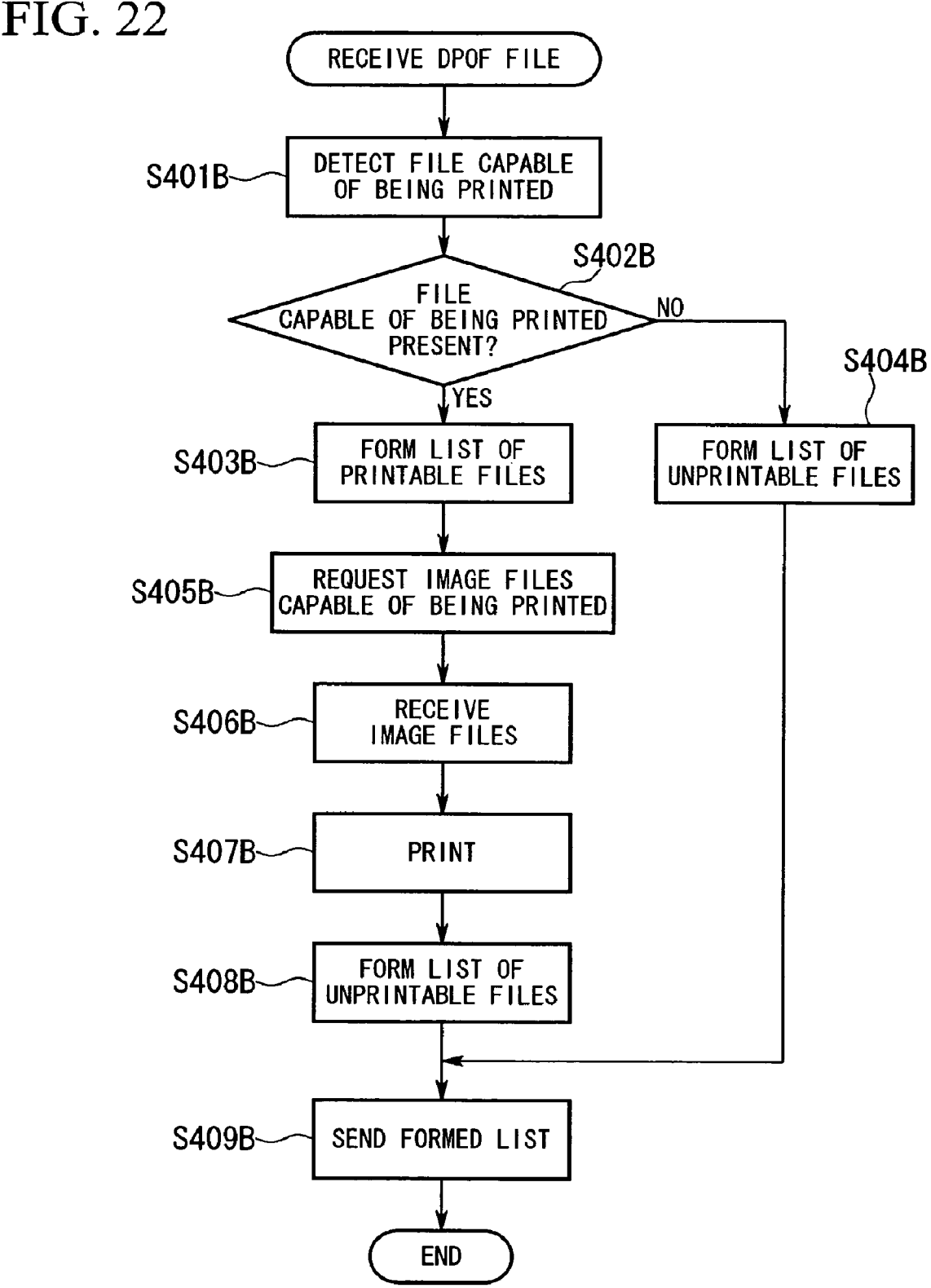
FIG. 22 is a flow chart showing a fourth example of printing control processing in printer 10 shown in FIG. 4.

For example, in the above-described present invention, printable image files were acquired each time a printing job was executed. However, it is also acceptable to confirm all at once the printability of the forms of all the image files to be printed, and to then acquire the print-compatible image files at one time. FIG. 22 shows a flow chart for the printing control process associated with this fourth example.

In FIG. 22, when CPU 51 of printer 10 receives a DPOF file from digital camera 1, it searches for printable files from among the image files in the DPOF file which have been designated for printing (step S401B). Next, CPU 51 judges whether of not there are any files present that are capable of being printed (step S402B). When a file that can be printed is present, that file is designated as a printable file, and a list of printable files is formed (step S403B). On the other hand, in the case where there are no files capable of being printed, all of the image files in the DPOF file which have been designated for printing are designated as unprintable files, and a list of these unprintable files is formed (step S404B).

In this example, a DPOF file form is employed as the list form for the printable and unprintable files. In other words, printer 10 records a job for the image files that are capable of being printed in the printable file list as shown in FIG. 19, and records a job for the image files that are not capable of being printed in the unprintable file list as shown in FIG. 21.

Next, in step S405B, CPU 51 requests the image files that are capable of being printed from digital camera 1 based on the printable file list that was formed. Next, the image files sent from digital camera 1 based on this request are received, and print out of the received image files is executed (step S406B, S407B). Next, CPU 51 designates the image files that were not printed out as unprintable files, and forms an unprintable file list (step S408B). As a method for determining these unprintable files, for example, CPU 51 references the DPOF file from digital camera 1 and the printable file list formed in step 403B, and judges that image files that are different are unprintable files. If no difference is present, then an unprintable file list is not formed.

Next, in step S409B, CPU 51 sends the formed list (printable file list or unprintable file list) to digital camera 1.

In this fourth example, since a list of print compatible file forms is known prior to printing, it is possible to estimate the number of prints and the duration of printing. Further, since processing is carried out based on this list, such effects are obtained as faster print processing.

Note that in the preceding embodiment, CPU 51, etc. of printer 10 corresponds to the printable file recognizing device, unprintable file recognizing device, and printable file requesting device. In addition, CPU 51 and USB controller 70, etc. correspond to the image file receiving device.

The preceding embodiments of the present invention were explained in detail with reference to the figures, however, the specific design is not limited thereto. Rather, various design modifications are possible provided that they do not depart from the gist of the invention.

For example, a USB connection method was employed as one method for a wired communication connection in the above-described embodiment. However, other methods may also be employed. For example, a wired communication connection method such as IEEE1394, RS-232C, etc. may be used. Additionally, wireless communication connection methods such as infrared are also acceptable.

In the above-described embodiments, the digital camera provided both the DPOF file and the image file to the printer. However, it is also acceptable if the source supplying the DPOF file (printing control information storing file) and the source supplying the image files are different. For example, the user may directly input the DPOF file into the printer.

In addition, the image file supplying device which is the partner from which the printer acquires the image files is not limited to a digital camera. For example, this device may be a cellular telephone with electronic photography functions. Alternatively, the device may be a terminal that is capable of reading out the image files from a recording media in which they are stored, such as, for example, a portable terminal referred to as a PDA (Personal Digital Assistant), a personal computer, etc.

Further, in addition to devices such as digital cameras whose main function is photography, the present invention's photographing apparatus also includes devices whose main function is not photography, such as cellular telephones that have an electronic photography function.

The present invention provides a photographing apparatus that can supply an image file to an external device to which it is connected to enable communication therewith, the photographing apparatus provided with:

a signal receiving device for receiving a signal that is output from the external device;

a communication state recognizing device for recognizing whether or not communication with the external device is possible based on the signal received by the signal receiving device;

a mode setting device for shifting the operating mode of the photographing apparatus itself to the communication mode, in which communication with the external device is carried out, in the case where the communication state recognizing device recognizes that communication with the external device is possible;

a mode selecting device which is manipulated by the user when the user selects the operating mode; and a shift prohibiting device for ignoring the directives of the mode selecting device and prohibiting a shift from the communication mode to another mode when communication with the external device is possible.

In the present invention, once the photographing apparatus and an external device have connected to enable communication therebetween, and the photographing apparatus has shifted to the communication mode, directives from the mode selecting device are ignored and the photographing apparatus does not shift from the communication mode to another mode, even if the user accidentally manipulates the mode selecting device and attempts to switch the operating mode of the photographing apparatus to another mode. Accordingly, inconvenience caused by the mistaken manipulation by the user can be prevented.

In the present invention's photographing apparatus, it is desirable that the mode setting device shift the operating mode from the photography mode, playback mode, or operation halt mode, in which the power supply is cut-off, to the communication mode when the communication state recognizing device recognizes that communication with the external device is possible.

In the present invention, when the photographing apparatus and an external device are connected so that communication is possible, the operating mode automatically shifts to the communication mode. As a result, extraneous operations are eliminated, and trouble to the user can be reduced.

It is desirable that the photographing apparatus of the present invention be provided with an operating mode confirming device for confirming the operating mode selected by the user, and that, in the case where the communication state recognizing device recognizes that communication with the external device is not possible, the mode setting device shift the operating mode from the communication mode to the operating mode confirmed by the operating mode confirming device.

In the present invention, when the communication connection between the photographing apparatus and an external device is released, the photographing apparatus automatically shifts to the operating mode selected by the mode selecting device, i.e., the operating mode that conforms with the user's intention. Thus, extraneous operations are eliminated, and trouble to the user can be reduced.

It is desirable that the present invention's photographing apparatus be provided with a lens barrel that can move between a collapsed position in which the lens barrel is collapsed inside the body of the photographing apparatus and a projecting position in which the lens barrel projects out from the front face of the photographing apparatus; a movement mechanism that moves the lens barrel between the collapsed position and the projecting position; and a barrel controlling device that drives the movement mechanism to move the lens barrel to the collapsed position when the operating mode is set to the communication mode.

In the present invention, when the photographing apparatus shifts to the communication mode, the lens barrel collapses into the body of the photographing apparatus. Thus, the lens barrel does not unintentionally come into contact with obstacles during the communication mode, thereby preventing damage to the lens barrel.

In the present invention's photographing apparatus, it is desirable that the mode selecting device be a lens barrier.

In the present invention, the operation of the user completing photography and closing the lens barrier serves as an indication to shift from photography mode to communication mode. Thus, extraneous operations are eliminated, and trouble to the user can be reduced.

The present invention provides a photographing apparatus that is provided with a lens barrel that can move between a collapsed position in which the lens barrel is collapsed inside the body of the photographing apparatus and a projecting position in which the lens barrel projects out from the front face of the photographing apparatus, the photographing apparatus further provided with:
 a signal receiving device for receiving a signal that is output from an external device;
 a communication state recognizing device for recognizing whether or not communication with the external device is possible based on the signal received by the signal receiving device;
 a movement mechanism for moving the lens barrel between the collapsed position and the projecting position; and
 a barrel controlling device for activating the movement mechanism in the case where the communication state recognizing device recognizes that communication with the external device is possible at a time when the lens barrel is in the projecting position, to move the lens barrel from the projecting position to the collapsed position.

In the present invention, when the photographing apparatus and an external device are connected so that communication is possible at a time when the lens barrel is in the position where it projects out from the main body of the photographing apparatus, the movement mechanism is activated to sink the lens barrel into the body of the photographing apparatus. As a result, even if the photographing apparatus is manipulated while it remains connected to the external device, there is no contact between the lens barrel and obstacles. Thus, it is possible to prevent in advance undesirable accidents in which there is an impact between the lens barrel and an obstacle.

The present invention provides a photographing apparatus that is provided with a lens barrel that can move between a collapsed position in which the lens barrel is collapsed inside the body of the photographing apparatus, and a projecting position in which the lens barrel projects out from the front face of the body of the photographing apparatus, the photographing apparatus further provided with:
 a signal receiving device for receiving a signal output from the external device via a communication cable that is connected to the external device;
 a communication state recognizing device for recognizing whether or not communication with the external device is possible based on the signal received by the signal receiving device;
 a movement mechanism for moving the lens barrel between the collapsed position and the projecting position;
 an external device recognizing device for recognizing the type of external device once the communication state recognizing device recognizes that communication with the external device is possible; and
 a barrel controlling device for activating the movement mechanism in the case where the external device recognizing device recognizes the type of external device at a time when the lens barrel is in the projecting position, to move the lens barrel from the projecting position to the collapsed position.

In the present invention, when the photographing apparatus and an external device are connected so that communication is possible and the type of external device connected is recognized, at a time when the lens barrel is in the position projecting out from the main body of the photographing apparatus, the movement mechanism is activated to sink the lens barrel into the body of the photographing apparatus. As a result, even if the photographing apparatus is manipulated while it remains connected to the external device, the lens barrel does not come into contact with an obstacle. Thus, it is possible to prevent in advance undesirable accidents in which there is an impact between the lens barrel and an obstacle.

In the present invention's photographing apparatus, it is desirable that an input device be further provided which is operated by the user when inputting the settings for supplying and printing the image files, and that the external device be a printer that can be operated from the photographing apparatus side by using the input device and that prints the image files supplied from the photographing apparatus.

In the present invention, when it is recognized that the connected partner is a printer, i.e., when a state is present in which the user can operate the printer using the input device, the lens barrel sinks into the body of the photographing apparatus. Thus, the collapsing action is carried out with suitable timing, and the frequency of the collapsing action can be decreased. As a result, it is possible to conserve the power of the photographing apparatus.

The present invention provides a printing system provided with a photographing apparatus that is equipped with a lens barrel that can move between a collapsed position in which the lens barrel is collapsed inside the body of the photographing apparatus and a projecting position in which the lens barrel projects out from the front face of the body of the photographing apparatus, and a printer that is connected via a communication cable to the photographing apparatus and prints an image file that is supplied from the photographing apparatus, wherein the printer is provided with:
 an outputting device for outputting a signal to the photographing apparatus via the communication cable; and
 a printing control device for printing the image file that is supplied from the photographing apparatus based on directives from the photographing apparatus; and
 the photographing apparatus is provided with:
 a signal receiving device for receiving a signal output from the printer via the communication cable;
 a communication state recognizing device for recognizing whether or not communication with the printer is possible based on the signal received by the signal receiving device;
 a printer recognizing device for recognizing whether or not the partner connected via the communication cable is a printer;
 a movement mechanism for moving the lens barrel between the collapsed position and the projecting position; and
 a barrel controlling device for activating the movement mechanism to move the lens barrel from the projecting position to the collapsed position in the case where the communication state recognizing device recognizes that communication with the printer is possible at a time when the lens barrel is in the projecting position, or in the case where the printer recognizing device recognizes that the partner connected via the communication cable is a printer at a time when the lens barrel is in the projecting position.

In the present invention, when the photographing apparatus and an external device are connected so that communication is possible at a time when the lens barrel is in the position projecting out from the main body of the photographing apparatus, or when it is recognized that the external device connected is a printer at a time when the lens barrel is in the projecting position, the movement mechanism is activated to sink the lens barrel into the body of the photographing apparatus. As a result, even if the photographing apparatus is manipulated while it remains connected to the external device, the lens barrel does not come into contact with an obstacle. Thus, it is possible to prevent in advance undesirable accidents in which there is an impact between the lens barrel and an obstacle.

The present invention provides a lens barrel controlling method in a photographing apparatus that is provided with a lens barrel that can move between a collapsed position in which the lens barrel is collapsed inside the body of the photographing apparatus and a projecting position in which the lens barrel projects out from the front face of the body of the photographing apparatus, which includes the steps of:

receiving a signal output from an external device;

recognizing whether or not communication with the external device is possible based on the received signal; and moving the lens barrel from the projecting position to the collapsed position in the case where it is recognized that communication with the external device is possible at a time when the lens barrel is in the projecting position.

In the present invention, when it is recognized that communication with an external device is possible at a time when the lens barrel is in a position in which it projects out from the main body of the photographing apparatus, the lens barrel sinks into the body of the photographing apparatus. As a result, even if the photographing apparatus is manipulated while it remains connected to the external device, the lens barrel does not come into contact with an obstacle. Thus, it is possible to prevent in advance undesirable accidents in which there is an impact between the lens barrel and an obstacle.

The present invention provides a lens barrel controlling method in a photographing apparatus that is provided with a lens barrel that can move between a collapsed position in which the lens barrel is collapsed inside the body of the photographing apparatus and a projecting position in which the lens barrel projects out from the front face of the body of the photographing apparatus, which includes the steps of:

receiving a signal output from an external device via a communication cable that is connected to the external device;

recognizing whether or not communication with the external device is possible based on the received signal;

recognizing the type of external device after recognizing that communication with the external device is possible; and moving the lens barrel from the projecting position to the collapsed position in the case where the type of external device is recognized at a time when the lens barrel is in the projecting position.

In the present invention, when the photographing apparatus and an external device are connected so that communication is possible, and the external device that is connected is recognized, at a time when the lens barrel is in the position projecting out from the main body of the photographing apparatus, the movement mechanism is activated to sink the lens barrel into the body of the photographing apparatus. As a result, even if the photographing apparatus is manipulated while it remains connected to the external device, the lens barrel does not come into contact with an obstacle. Thus, it is possible to prevent in advance undesirable accidents in which there is an impact between the lens barrel and an obstacle.

The present invention provides a photographing apparatus that can supply an image file to an external device to which it is connected to enable communication therewith, the photographing apparatus provided with:

a signal receiving device for receiving a signal output from the external device;

a communication state recognizing device for recognizing whether or not communication with the external device is possible based on the signal received by the signal receiving device;

an operating mode confirming device for confirming the operating mode selected by the user when the communication state recognizing device recognizes that communication with the external device is not possible; and a mode setting device for shifting the operating mode of the photographing apparatus to the communication mode, in which communication with the external device is carried out, in the case where the communication state recognizing device recognizes that communication with the external device is possible, and shifts the operating mode from the communication mode to the operating mode confirmed by the operating mode confirming device in the case where the communication state recognizing device recognizes that communication with the external device is not possible.

In the present invention, when the photographing apparatus and an external device connect so that communication is possible, the operating mode of the photographing apparatus automatically shifts to the communication mode, while, when the communication connection between the photographing apparatus and the external device is released, the operating mode of the photographing apparatus automatically shifts to the operating mode selected by the user. As a result, extraneous manipulations can be eliminated, reducing trouble to the user, and the next operation can be carried out smoothly.

It is desirable that the photographing apparatus of the present invention be provided with a mode selecting device that can be operated by the user when selecting an operating mode, and that, in the case where the communication state recognizing device recognizes that communication with the external device is not possible, the mode setting device shift the operating mode from the communication mode to the operating mode selected by the user using the mode selecting device.

In the present invention, when the communication connection between the photographing apparatus and the external device is released, the operating mode of the photographing apparatus automatically shifts to the operating mode selected by the user using the mode selecting device. Thus, extraneous manipulations can be eliminated, reducing trouble to the user, and the next operation can be executed smoothly.

It is desirable that the present invention's photographing apparatus be provided with a lens barrier that can move between a closed position covering the lens and an open position exposing the lens, and that the mode setting device shift the operating mode to the operation halt mode when the lens barrier is in a closed position, and shifts the operating mode to the photography mode when the lens barrier is in the open position.

In the present invention, the operation of the user completing photography and closing the lens barrier serves as the indication to shift from photography mode to communication mode, while the operation of the user opening the lens barrier for photography serves as the indication to shift from the photography mode to the communication mode. Thus, extraneous manipulations can be eliminated, reducing trouble to the user, and the next operation can be executed smoothly.

It is desirable that the present invention's photographing apparatus be provided with a lens barrel that can move between a collapsed position in which the lens barrel is collapsed inside the body of the photographing apparatus and a projecting position in which the lens barrel projects out from the front face of the photographing apparatus; a movement mechanism for moving the lens barrel between the collapsed position and the projecting position; and a barrel controlling device for activating the movement mechanism in the case where the operating mode is set to the communication mode, to move the lens barrel from the projecting position to the collapsed position.

In the present invention, when the operating mode of the photographing apparatus is set to the communication mode, the movement mechanism is activated to sink the lens barrel into the body of the photographing apparatus. As a result, even if the photographing apparatus is manipulated while still set to the communication mode, there is no contact between the lens barrel and obstacles. Thus, it is possible to prevent in advance undesirable accidents in which there is an impact between the lens barrel and an obstacle.

The present invention provides a photographing apparatus that can supply an image file to an external device, that is provided with:
  a signal receiving device for receiving a signal output from the external device;
  a communication state recognizing device for recognizing whether or not communication with the external device is possible based on the signal received by the signal receiving device;
  a mode setting device for setting the operating mode of the photographing apparatus itself to the communication mode, in which communication with the external device is carried out, in the case where the communication state recognizing device recognizes that communication with the external device is possible;
  a recording device for recording the operating mode that preceded setting to the communication mode; and
  a mode resetting device for resetting the operating mode from the communication mode to the operating mode recorded in the recording device in the case where the communication state recognizing device recognizes that communication with the external device is not possible.

In the present invention, when the communication connection between the photographing apparatus and an external device is released, the operating mode of the photographing apparatus automatically shifts to the operating mode selected prior to the communication mode. Thus, extraneous manipulations can be eliminated, reducing trouble to the user, and the next operation can be executed smoothly.

The present invention provides a printer that acquires and prints an image file from an image file supplying device to which it is connected to enable communication therewith, wherein the printer is provided with:
  a printability judging device for judging whether or not the form of the image file to be printed is a form that is capable of being printed, by referencing a printing control information storing file that stores the file name and form of the image files to be printed; and
  an image acquiring device for acquiring from the image file supplying device only those image files that are in a form that is capable of being printed from among the stored image files for which file name and form are stored in the printing control information storing file.

It is desirable that the present invention's printer be provided with a first list forming device for forming a list on which only image files that are in a form capable of being printed are collected from among the stored image files for which file name and form are stored in the printing control information storing file.

It is desirable that the present invention's printer be provided with a second list forming device for forming a list on which only image files that are in a form that is incapable of being printed are collected from among the stored image files for which file name and form are stored in the printing control information storing file.

The present invention provides a printer control method that acquires and prints an image file from an image file supplying device to which it is connected to enable communication therewith, the method including the steps of:
  judging whether or not the form of the image file to be printed is a form that is capable of being printed, by referencing a printing control information storing file that stores the file name and form of the image files to be printed; and
  acquiring from the image file supplying device only those image files that are in a form that is capable of being printed from among the stored image files for which file name and form are stored in the printing control information storing file.

It is desirable that the present invention's printer control method include a step for forming a list on which only image files that are in a form that is capable of being printed are collected from among the stored image files for which file name and form are stored in the printing control information storing file.

It is desirable that the present invention's printer control method include a step for forming a list on which only image files that are in a form that is incapable of being printed are collected from among the stored image files for which file name and form are stored in the printing control information storing file.

The present invention provides a printing system that is provided with a photographing apparatus, and a printer that is connected to enable communication with the photographing apparatus and that acquires and prints an image file from the photographing apparatus, the photographing apparatus provided with:
  a file supplying device that supplies to the printer a printing control information storing file in which the file name and form of the image file to be printed are stored; and
  an image supplying device that supplies an image file to the printer;
  and the printer is provided with:
  a printability judging device for judging whether or not the form of the image file to be printed is a form that is capable of being printed, by referencing a printing control information storing file that is supplied from the photographing apparatus; and
  an image acquiring device for acquiring from the image file supplying device only those image files that are in a form that is capable of being printed from among the stored image files for which file name and form are stored in the printing control information storing file.

It is desirable that the present invention's printing system be provided with a first list forming device for forming a list on which only image files that are in a form that is capable of being printed are collected from among the stored image files for which file name and form are stored in the printing control information storing file.

It is desirable that the present invention's printing system be provided with a second list forming device for forming a list on which only image files that are in a form that is incapable of being printed are collected from among the stored image files for which file name and form are stored in the printing control information storing file.

The present invention provides a printer for printing an image file supplied from an image file supplying device, that is provided with:

a printable file recognizing device for recognizing as printable files those image files that are in a form that is capable of being printed, from among the image files whose file name and form are stored in a printing control information storing file that is acquired from the image file supplying device;

a first list forming device for forming a list of printable files;

a printable file requesting device for requesting from the image file supplying device the image files that are included in the list of printable files; and an image file receiving device for receiving the image file sent from the image file supplying device.

It is desirable that the present invention's printer be provided with an unprintable file recognizing device for recognizing as unprintable files those image files that are in a form that is incapable of being printed, from among the image files whose file name and form are stored in a printing control information storing file that is acquired from the image file supplying device; and a second list forming device for forming a list on which only unprintable files are collected.

It is desirable that the present invention's printer send the printable file list to the image file supplying device when printing is completed.

It is desirable that the present invention's printer send at least one of either the printable file list or the unprintable file list to the image file supplying device when printing is completed.

The present invention provides a control method for a printer that prints an image file supplied from an image file supplying device, the method including the steps of:

recognizing as printable files those image files that are in a form that is capable of being printed, from among the image files whose file name and four are stored in a printing control information storing file that is acquired from the image file supplying device;

forming a list on which only printable files are collected;

requesting from the image file supplying device the image files that are included in the list of printable files; and receiving the image file sent from the image file supplying device.

In the present invention, a judgment is made as to whether or not the image file to be printed, i.e., the image file designated by the user, is in a form that is capable of being printed by referencing the content of the printing control information storing file. Thus, a check is automatically carried out before printing. Further, since only image files that are capable of being printed are acquired from the image file supplying device, useless data is not handled, so that the time for the printing operation can be shortened.

Preferred embodiments of the present invention were explained above, however the present invention is not limited thereto. Rather, additions, omissions, exchanges and other variations are possible within limits that do not depart from the gist of the invention. The present invention is not limited by the preceding explanation, but is limited only by the scope of the accompanying claims.

What is claimed is:

1. A photographing apparatus having a lens barrel that is movable between a projecting position in which the lens barrel projects out from the front face of the photographing apparatus and a collapsed position in which the lens barrel is collapsed inside the body of the photographing apparatus, the photographing apparatus comprising:

a movement mechanism for moving the lens barrel between the projecting position and the collapsed position, a first recognizing section for recognizing whether or not an electrical connection is established between a printer or a personal computer, an operating mode confirmation section for confirming a current operating mode when the electrical connection is recognized by the first recognizing section, a control section for controlling the movement mechanism so as to move the lens barrel which is positioned at the projected position to the collapsed position, when a current operating mode is confirmed to be a photography mode in which the lens barrel has been in the projecting position by the operating mode confirmation section, a selection screen displaying section for prompting a user to select either the printer or the personal computer being connected to the photographing apparatus, when the lens barrel has moved to the collapsed position controlled by the control section, a second recognizing section for recognizing whether or not a communication connection between the printer has been established when the printer is selected by the user, and for recognizing whether or not a communication connection between the personal computer has been established when the personal computer is selected by the user.

2. A photographing apparatus having a lens barrel that is movable between a projecting position in which the lens barrel projects out from the front face of the photographing apparatus and a collapsed position in which the lens barrel is collapsed inside the body of the photographing apparatus, the photographing apparatus comprising:

a first recognizing section for recognizing whether or not an electrical connection is established between a printer or a personal computer, an operating mode confirmation section for confirming a current operating mode when the electrical connection is recognized by the first recognizing section, a selection screen displaying section for prompting a user to select either the printer or the personal computer to be connected to the photographing apparatus, when the lens barrel has been moved to the collapsed position controlled by the control section, a second recognizing section for recognizing whether or not a communication connection between the printer has been established when the printer is selected by the user, a movement mechanism for moving the lens barrel between the projecting position and the collapsed position, a control section for controlling the movement mechanism to move the lens barrel which is positioned at the projected position to the collapsed position, when a communication connection between the printer has been established by the second recognizing section, and when a current operating mode is confirmed to be a photography mode in which the lens barrel has been in the projecting position by the operating mode confirmation section.

3. A lens barrel controlling method for a photographing apparatus having a lens barrel that is movable between a projecting position in which the lens barrel projects out from the front face of the body of the photographing apparatus and a collapsed position in which the lens barrel is collapsed inside the body of the photographing apparatus, the method comprising the steps of:
  recognizing whether or not an electrical connection is established between a printer or a personal computer,
  confirming a current operating mode when the electrical connection between the printer or the personal computer is recognized,
  moving the lens barrel which is positioned at the projected position to the collapsed position, when a current operating mode is confirmed to be a photography mode in which the lens barrel has been in the projecting position,
  displaying a selection screen which prompts a user to select either the printer or the personal computer being connected to the photographing apparatus, when the lens barrel has moved to the collapsed position,
  recognizing whether or not a communication connection between the printer has been established when the printer is selected by the user, and for recognizing whether or not a communication connection between the personal computer has been established when the personal computer is selected by the user.

4. A lens barrel controlling method for a photographing apparatus having a lens barrel that is movable between a projecting position in which the lens barrel projects out from the front face of the body of the photographing apparatus and a collapsed position in which the lens barrel is collapsed inside the body of the photographing apparatus, the method comprising the steps of:
  recognizing whether or not an electrical connection is established between a printer or a personal computer,
  confirming a current operating mode when the electrical connection is recognized,
  displaying a selection screen which prompts a user to select either the printer or the personal computer being connected to the photographing apparatus,
  recognizing whether or not a communication connection between the printer has been established when the printer is selected by the user,
  moving the lens barrel which is positioned at the projected position to the collapsed position, when a communication connection between the printer has been established, and when a current operating mode is confirmed to be a photography mode in which the lens barrel has been in the projecting position.

* * * * *